US011540303B1

(12) United States Patent
Wang et al.

(10) Patent No.: US 11,540,303 B1
(45) Date of Patent: Dec. 27, 2022

(54) IMPACT OF UPLINK OR SIDELINK CANCELLATION

(71) Applicant: QUALCOMM Incorporated, San Diego, CA (US)

(72) Inventors: Xiaojie Wang, Hillsborough, NJ (US); Xiaoxia Zhang, San Diego, CA (US); Jing Sun, San Diego, CA (US); Piyush Gupta, Bridgewater, NJ (US); Junyi Li, Fairless Hills, PA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 25 days.

(21) Appl. No.: 17/342,460

(22) Filed: Jun. 8, 2021

(51) Int. Cl.
*H04W 72/12* (2009.01)
*H04W 72/04* (2009.01)
*H04W 52/52* (2009.01)
*H04W 92/18* (2009.01)

(52) U.S. Cl.
CPC ....... *H04W 72/1263* (2013.01); *H04W 52/52* (2013.01); *H04W 72/0446* (2013.01); *H04W 72/0453* (2013.01); *H04W 72/1257* (2013.01); *H04W 92/18* (2013.01)

(58) Field of Classification Search
CPC ............. H04W 72/1263; H04W 52/52; H04W 72/0446; H04W 72/0453; H04W 72/1257; H04W 92/18
See application file for complete search history.

(56) References Cited

U.S. PATENT DOCUMENTS

| 10,375,722 | B2 * | 8/2019 | Khoryaev | ............. | H04W 76/23 |
| 10,477,516 | B2 * | 11/2019 | Fodor | ................... | H04W 64/00 |
| 10,631,271 | B2 * | 4/2020 | Gulati | ............... | H04W 72/0446 |
| 10,667,239 | B2 * | 5/2020 | Sartori | .................. | H04W 72/02 |

* cited by examiner

*Primary Examiner* — Chandrahas B Patel
(74) *Attorney, Agent, or Firm* — Holland & Hart LLP

(57) ABSTRACT

Methods, systems, and devices for wireless communications are described. A user equipment (UE) may alter, or otherwise cancel, a sidelink communication as a result of a cancelation indicator (CI) corresponding to a different UE to support automatic gain control (AGC) calibration. The UE may determine to cancel or alter sidelink resources that at least partially overlap in time and are adjacent to, yet non-overlapping, in frequency to a high priority transmission. In some implementations, the UE may cancel the sidelink communication from an earliest overlapping symbol to the end of a slot. In other implementations, the UE may cancel a portion of the sidelink communication and resume sidelink communications within the same slot. Additionally or alternatively, the UE may utilize one or more reference signals or symbols to enable AGC recalibration during the slot.

30 Claims, 13 Drawing Sheets

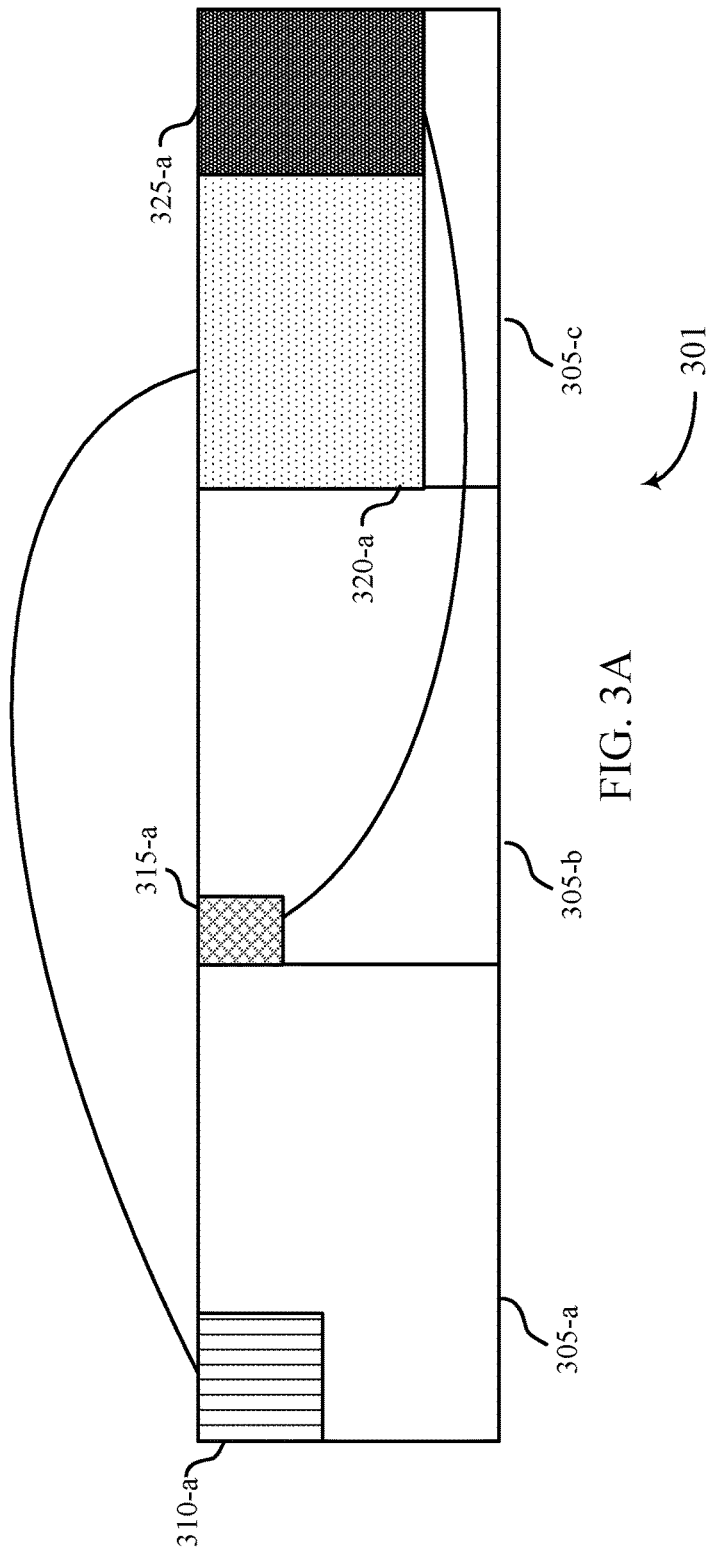
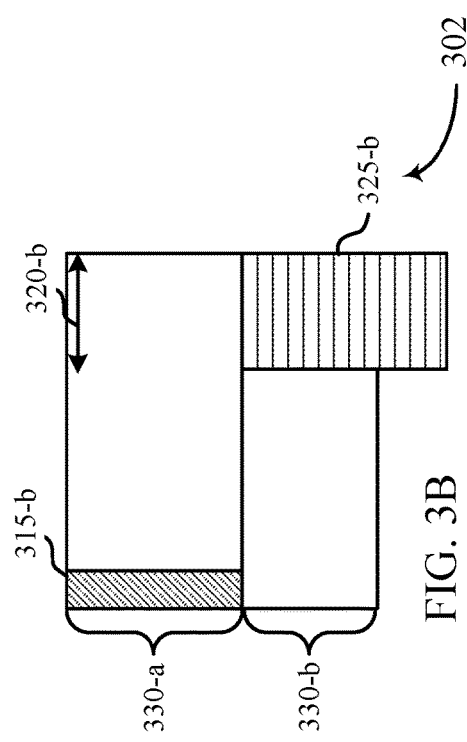
FIG. 3A
FIG. 3B

IMPACT OF UPLINK OR SIDELINK CANCELLATION

FIELD OF TECHNOLOGY

The following relates to wireless communications, including mitigating the impact of uplink or sidelink cancellation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A base station may schedule resources for an uplink message in support of a low priority communication (e.g., enhanced mobile broadband (eMBB)) at a UE. In some cases, the base station may receive a higher priority message (e.g., an ultra-reliable low latency communication (URLLC) message), for instance, after scheduling the eMBB uplink message, and may need to schedule communications associated with the higher priority message. The base station may cancel or otherwise alter resources previously scheduled for the eMBB uplink message to expedite transmission of the higher priority message. Specifically, the base station may transmit a cancellation indicator (CI) to indicate, to the UE, which resources the UE is to refrain from utilizing for the eMBB uplink message. The resources indicated by the CI may be reallocated to a different UE in support of a URLLC transmission. However, the reallocation of resources, coupled with a relatively high likelihood of a higher power transmission associated with a URLLC transmission, may have additional consequences within a surrounding wireless network.

SUMMARY

The described techniques relate to improved methods, systems, devices, and apparatuses that support mitigating the impact of uplink or sidelink cancellation. Generally, the described techniques provide for a sidelink user equipment (UE) to cancel or otherwise alter a sidelink communication based on a cancelation indicator (CI) transmitted to a different UE. The CI may indicate a cancellation of a previously-scheduled transmission from the other UE in favor of a higher priority transmission, such as an ultra-reliable low latency communication (URLLC) transmission. The canceled transmission, and subsequently the higher priority transmission, may be associated with resources that are within a same bandwidth part (BWP) as those monitored by the sidelink UE; the resources may overlap in the time domain but may be non-overlapping in the frequency domain. If the higher priority transmission has a relatively high transmit power, communications at the sidelink UE in the BWP may be negatively impacted. To mitigate possible automatic gain control (AGC) effects from the higher priority transmission, the sidelink UE may alter one or more aspects of the sidelink communications.

For example, the sidelink UE may receive a CI indicating that a transmission (e.g., by a different UE) over a first set of resources is to be canceled in support of a higher priority transmission, where the first set of resources may overlap in time, but not in frequency, with a second set of resources utilized for sidelink transmissions by the sidelink UE. The sidelink UE may determine that the first set of resources is close in frequency to the second set of resources and may alter the communications over the sidelink accordingly. As an example, the sidelink UE may cancel portions of the sidelink communications from the earliest symbol overlapping in the time domain with the higher priority message to the end of the communication slot. Alternatively, the sidelink UE may cancel portions of the sidelink communications that are directly adjacent in the frequency domain to the high priority message and may subsequently resume sidelink transmissions, e.g., within the same communications slot, following the cancelled portions. Additionally or alternatively, the sidelink UE may transmit a reference signal in the first symbol of the resumed sidelink transmissions to a receiving sidelink UE, enabling the receiving sidelink UE to recalibrate AGC based on the reference signal. In some cases, the sidelink UE may cancel, or insert a dummy symbol within, the sidelink communications during the high priority message while the receiving sidelink UE performs AGC to account for increased signal receive power during the dummy symbol.

In some examples, the sidelink UE may not cancel the sidelink transmission; instead, the sidelink UE may transmit a second AGC symbol (e.g., in addition to the first AGC symbol transmitted at the beginning of the slot) to the receiving sidelink UE. This may enable the receiving sidelink UE to recalibrate AGC in the presence of the higher priority message based on the second AGC symbol. In some cases, the second AGC symbol may be a dedicated AGC reference signal or demodulation reference signal (DMRS) and may be used to measure the power variation introduced by the higher priority transmission at the receiving sidelink UE, thus enabling AGC recalibration.

A method for wireless communications at a first UE is described. The method may include receiving, at the first UE, a cancellation indicator instructing a second UE to cancel transmissions over a first set of resources, identifying that the first UE is scheduled to communicate via sidelink communications over a second set of resources that at least partially overlap in time with the first set of resources, the second set of resources being within a same bandwidth part as the first set of resources but covering a different frequency range than the first set of resources, and modifying at least a portion of the sidelink communications over the second set of resources based on receipt of the cancellation indicator pertaining to the first set of resources.

An apparatus for wireless communications at a first UE is described. The apparatus may include a processor, memory coupled with the processor, and instructions stored in the memory. The instructions may be executable by the processor to cause the apparatus to receive, at the first UE, a CI instructing a second UE to cancel transmissions over a first set of resources, identify that the first UE is scheduled to communicate via sidelink communications over a second set of resources that at least partially overlap in time with the first set of resources, the second set of resources being within a same BWP as the first set of resources but covering a different frequency range than the first set of resources, and modify at least a portion of the sidelink communications over the second set of resources based on receipt of the CI pertaining to the first set of resources.

Another apparatus for wireless communications at a first UE is described. The apparatus may include means for receiving, at the first UE, a CI instructing a second UE to cancel transmissions over a first set of resources, means for identifying that the first UE is scheduled to communicate via sidelink communications over a second set of resources that at least partially overlap in time with the first set of resources, the second set of resources being within a same BWP as the first set of resources but covering a different frequency range than the first set of resources, and means for modifying at least a portion of the sidelink communications over the second set of resources based on receipt of the CI pertaining to the first set of resources.

A non-transitory computer-readable medium storing code for wireless communications at a first UE is described. The code may include instructions executable by a processor to receive, at the first UE, a CI instructing a second UE to cancel transmissions over a first set of resources, identify that the first UE is scheduled to communicate via sidelink communications over a second set of resources that at least partially overlap in time with the first set of resources, the second set of resources being within a same BWP as the first set of resources but covering a different frequency range than the first set of resources, and modify at least a portion of the sidelink communications over the second set of resources based on receipt of the CI pertaining to the first set of resources.

In some examples of the method, apparatuses, and non-transitory computer-readable medium described herein, modifying at least the portion of the sidelink communications over the second set of resources may include operations, features, means, or instructions for canceling transmission of at least a portion of the sidelink communications over the second set of resources.

Some examples of the method, apparatuses, and non-transitory computer-readable medium described herein may further include operations, features, means, or instructions for determining that a size of a resource block allocation of the first set of resources within the BWP satisfies a BWP allocation threshold, where canceling at least the portion of the transmission may be based on the BWP allocation threshold being satisfied.

In some examples of the method, apparatuses, and non-transitory computer-readable medium described herein, modifying at least the portion of the sidelink communications over the second set of resources may include operations, features, means, or instructions for canceling transmission of at least a portion of the sidelink communications over the second set of resources, where the second set of resources may be within a threshold frequency range of the first set of resources and a threshold number of symbols of the first set of resources.

In some examples of the method, apparatuses, and non-transitory computer-readable medium described herein, modifying at least the portion of the sidelink communications over the second set of resources may include operations, features, means, or instructions for identifying a first symbol of the second set of resources that overlaps in time with a first symbol of the first set of resources and canceling transmission of at least a portion of the sidelink communications over the second set of resources, where the second set of resources extends from an initial symbol of the first set of resources to a last symbol in a slot that includes the second set of resources.

In some examples of the method, apparatuses, and non-transitory computer-readable medium described herein, modifying at least the portion of the sidelink communications over the second set of resources may include operations, features, means, or instructions for canceling transmission of at least a first portion of the sidelink communications over the second set of resources and transmitting a second portion of the sidelink communications over a third set of resources that may be subsequent to the second set of resources in time and within a same slot as the second set of resources.

Some examples of the method, apparatuses, and non-transitory computer-readable medium described herein may further include operations, features, means, or instructions for transmitting, over one or more initial symbols of the third set of resources, a reference signal for AGC determination.

In some examples of the method, apparatuses, and non-transitory computer-readable medium described herein, the reference signal may be a DMRS or a dedicated AGC reference signal.

Some examples of the method, apparatuses, and non-transitory computer-readable medium described herein may further include operations, features, means, or instructions for transmitting, over an initial symbol of the third set of resources, a communication that may be a duplicate of either a previous symbol communication or a subsequent symbol communication.

Some examples of the method, apparatuses, and non-transitory computer-readable medium described herein may further include operations, features, means, or instructions for transmitting sidelink control information (SCI) that includes an indication that the sidelink communications may be resumed or to be resumed via transmission of the second portion of the sidelink communications over the third set of resources.

Some examples of the method, apparatuses, and non-transitory computer-readable medium described herein may further include operations, features, means, or instructions for transmitting SCI that includes an indication that triggers AGC refinement during the second set of resources.

In some examples of the method, apparatuses, and non-transitory computer-readable medium described herein, modifying at least the portion of the sidelink communications over the second set of resources may include operations, features, means, or instructions for receiving a reference signal during a gap period defined by the second set of resources, the gap period extending to at least a last symbol of the first set of resources, determining an AGC based on receipt of the reference signal, and applying the AGC to reception of the sidelink communications transmitted after the gap period and within a same slot as the second set of resources.

In some examples of the method, apparatuses, and non-transitory computer-readable medium described herein, modifying at least the portion of the sidelink communications over the second set of resources may include operations, features, means, or instructions for performing a power measurement of communications transmitted over the first set of resources during a gap period defined by the second set of resources, refining AGC during the gap period, and applying a refined AGC to reception of the sidelink communications transmitted after the gap period and within a same slot as the second set of resources, the reception of the sidelink communications overlapping in time, at least partially, with the first set of resources.

Some examples of the method, apparatuses, and non-transitory computer-readable medium described herein may further include operations, features, means, or instructions for receiving SCI that includes an indication that the sidelink communications may be resumed or to be resumed via transmission of the second portion of the sidelink communications after the gap period.

In some examples of the method, apparatuses, and non-transitory computer-readable medium described herein, the indication triggers the power measurement and AGC refinement during the gap period.

In some examples of the method, apparatuses, and non-transitory computer-readable medium described herein, modifying at least the portion of the sidelink communications over the second set of resources may include operations, features, means, or instructions for identifying a first symbol of the second set of resources that overlaps in time with an initial symbol of the first set of resources, transmitting, over the first symbol of the second set of resources, a communication for AGC determination, and transmitting the sidelink communications after the first symbol and during a remaining portion of the second set of resources.

In some examples of the method, apparatuses, and non-transitory computer-readable medium described herein, the communication for AGC determination may be a duplicate of either a previous symbol communication or a subsequent symbol communication.

In some examples of the method, apparatuses, and non-transitory computer-readable medium described herein, the communication for AGC determination may be a reference signal.

Some examples of the method, apparatuses, and non-transitory computer-readable medium described herein may further include operations, features, means, or instructions for identifying that a DMRS may be scheduled to be transmitted during a symbol other than the first symbol, identifying that the DMRS may be the communication for AGC determination, swapping a data signal scheduled to be transmitted on the first symbol with the DMRS such that the DMRS may be transmitted on the first symbol, and transmitting SCI indicating a symbol index associated with the DMRS, where the symbol index may be based on a generated DMRS sequence.

In some examples of the method, apparatuses, and non-transitory computer-readable medium described herein, the communication for AGC determination may be a duplicate of either a previous symbol communication or a subsequent symbol communication.

In some examples of the method, apparatuses, and non-transitory computer-readable medium described herein, the communication for AGC determination may be a reference signal.

Some examples of the method, apparatuses, and non-transitory computer-readable medium described herein may further include operations, features, means, or instructions for receiving, via either SCI or the cancellation indication, an indication that a symbol index associated with a DMRS, where the DMRS may be the communication for AGC determination and where the symbol index may be based on a generated DMRS sequence.

In some examples of the method, apparatuses, and non-transitory computer-readable medium described herein, modifying at least the portion of the sidelink communications over the second set of resources may include operations, features, means, or instructions for identifying a first symbol of the second set of resources that overlaps in time with an initial symbol of the first set of resources, receiving, over the first symbol of the second set of resources, a communication for AGC determination, and receiving the sidelink communications after the first symbol and during a remaining portion of the second set of resources.

BRIEF DESCRIPTION OF THE DRAWINGS

FIGS. 3A and 3B illustrate examples of a ULCI in a communication slot and a bandwidth part that support mitigating the impacts of uplink or sidelink cancellations in accordance with aspects of the present disclosure.

DETAILED DESCRIPTION

Figure 1:
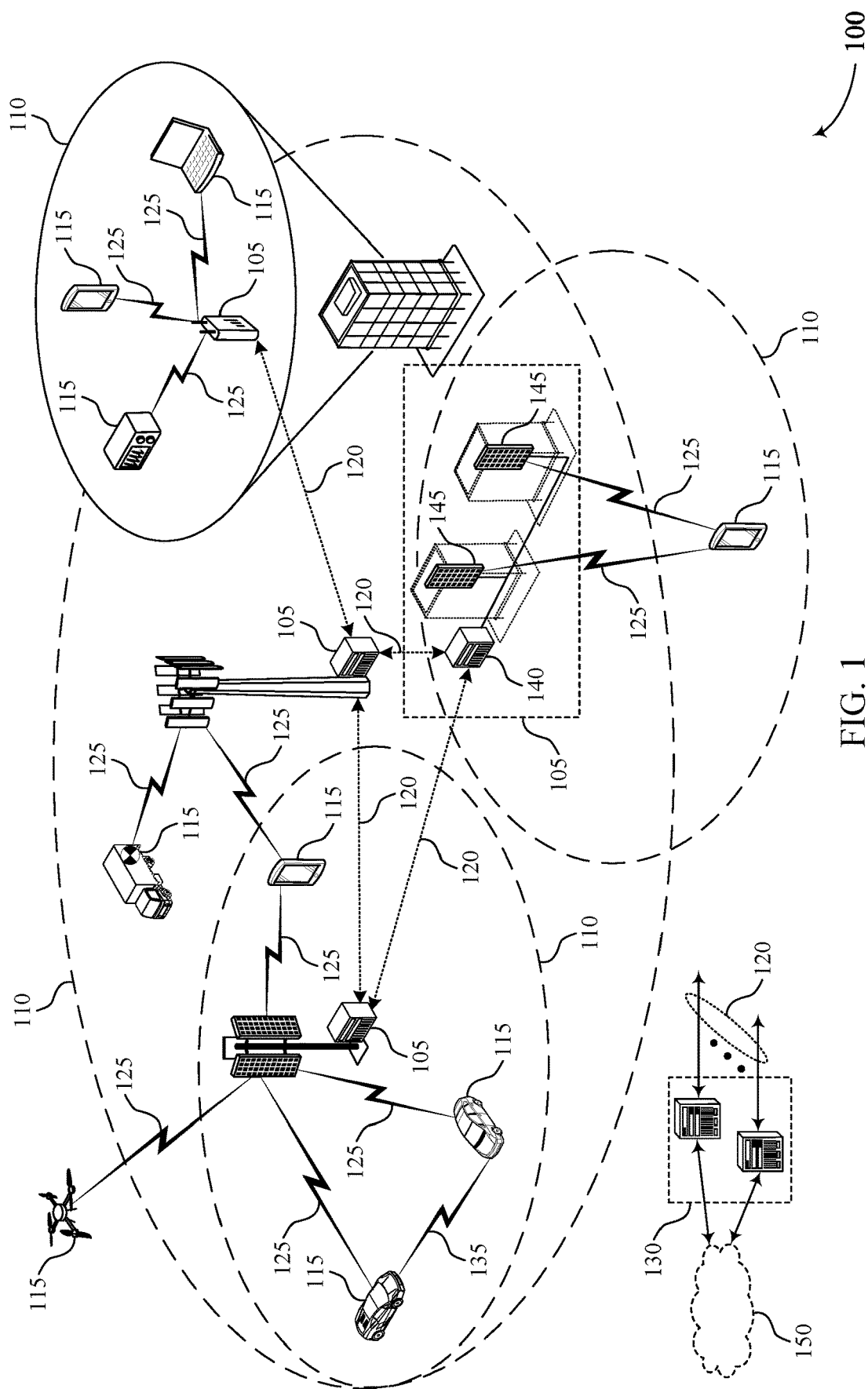
FIG. 1 illustrates an example of a wireless communications system that supports mitigating the impact of uplink or sidelink cancellation in accordance with aspects of the present disclosure.

Aspects of the present disclosure describe techniques and signaling to dynamically reallocate resources in support of cancellation indicators (CIs) in wireless systems in scenarios where universal mobile telecommunications system air interface (Uu) resources and sidelink resources may share a common bandwidth part (BWP). Specifically, aspects of the present disclosure describe a CI indicating resources corresponding to a high priority message (e.g., an ultra-reliable low latency communication (URLLC) message) at a user equipment (UE) that is different than a sidelink UE. Based on the CI, the sidelink UE may modify transmissions that may utilize resources that are adjacent in frequency to the high priority message. For example, to mitigate possible automatic gain control (AGC) effects from the high priority transmission, the sidelink UE may cancel or otherwise alter at least a portion of a sidelink communication that corresponds to resources that are adjacent in frequency to the indicated resources. In some cases, the sidelink UE may cancel the sidelink transmission of an earliest overlapping symbol to the end of a communication slot in response to the CI. By canceling the sidelink transmission from the earliest overlapping symbol to the end of the communication slot, a receiving sidelink UE may maintain a previously configured AGC setting. In other words, the receiving sidelink UE may avoid experiencing power variations associated with the higher priority message being transmitted at a higher power. Additionally or alternatively, the sidelink UE may utilize one or more reference signals to adapt the AGC settings to the communications environment created by the high priority message. In particular, the receiving sidelink UE communicating with the sidelink UE may recalibrate AGC based on the reference signal to account for the increased power resulting from the presence of the high priority message transmission. For example, the receiving sidelink UE may receive a dedicated AGC signal in addition to an initial AGC symbol received at the beginning of the communication slot. Based on the dedicated AGC signal, the receiving sidelink UE may modify the sidelink by dynamically recalibrating AGC in the presence of a higher priority message, which may account for increased signal power at the receiving sidelink UE.

In some cases, the UE may utilize a dummy symbol or gap period for at least part of the duration of the URLLC transmission. In other cases, the UE may leverage a second AGC symbol to transmit a dedicated AGC reference signal or demodulation reference signal (DMRS) that may be used to measure power variation introduced by the high priority message. By implementing the above techniques, the wireless communication system is able to flexibly support a dynamic reallocation of low priority resources to support low latency, high priority communications while also enabling AGC recalibration in support of sidelink communications that coexist with the high priority resources in a common BWP.

Aspects of the disclosure are initially described in the context of wireless communications systems. Aspects of the disclosure are then described with references to uplink CI (ULCI) in a communication slot, a bandwidth part, non-overlapping cancellations, and a process flow. Aspects of the disclosure are further illustrated by and described with reference to apparatus diagrams, system diagrams, and flowcharts that relate to mitigating the impact of uplink or sidelink cancellation.

FIG. 1 illustrates an example of a wireless communications system 100 that supports mitigating the impact of uplink or sidelink cancellation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system.

In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Aspects of the present disclosure describe techniques and signaling to enable a sidelink UE 115 to cancel or otherwise alter a sidelink communication as a result of a CI transmitted to a different UE 115, in which the CI may pertain to resources that are within the same BWP as those monitored by the sidelink UE 115, but may be non-overlapping in frequency. Additionally, the CI may indicate resources to be used by a high priority message (e.g., a URLLC transmission). Because the resources corresponding to the sidelink UE 115 are different from those implicated by the CI, and may correspond to lower priority transmissions, the sidelink UE 115 may alter communications profiles due to the CI. To mitigate possible AGC effects from an urgently scheduled higher priority transmission (e.g., due to increase power at a receiving sidelink UE 115), the sidelink UE 115 may alter one or more aspects of the sidelink communications due to the CI.

For example, the sidelink UE 115 may cancel portions of the sidelink communications from the earliest symbol overlapping with the high priority message to the end of the communication slot. By canceling portions of the sidelink communications, the receiving sidelink UE 115 may not receive sidelink transmissions during the high priority message, avoiding increased signal power and related AGC issues. Alternatively, the sidelink UE may cancel portions of the sidelink communications that are directly adjacent to the high priority message transmission and may subsequently resume sidelink transmissions within the same communications slot following the cancelled portions. For example, the sidelink UE 115 may transmit a dedicated AGC symbol to the receiving sidelink UE 115. Based on the dedicated AGC symbol, the receiving sidelink UE 115 may recalibrate AGC in the presence of the high priority message. Additionally or alternatively, the sidelink UE 115 may transmit a reference signal in the first symbol of the resumed sidelink transmissions to the receiving sidelink UE 115, enabling the receiving sidelink UE 115 to recalibrate AGC based on the reference signal. In some cases, the sidelink UE 115 may cancel, or insert a dummy symbol within, the sidelink communications during the high priority message while the receiving sidelink UE 115 performs AGC to account for increased signal receive power during the dummy symbol.

In some examples, the sidelink UE may not cancel the sidelink transmission;

instead, the sidelink UE 115 may transmit a second AGC symbol (e.g., in addition to the first AGC symbol transmitted at the beginning of the slot). The second AGC symbol may be used to transmit and receive a dedicated AGC reference signal or demodulation reference signal (DMRS) and may be used to measure the power variation introduced by the higher priority transmission, thus enabling AGC recalibration. For example, the sidelink UE 115 may transmit a DMRS, separate from an initial DMRS corresponding to the communication slot, to the receiving sidelink UE 115. Based on the dedicated AGC symbol, the receiving sidelink UE 115 may recalibrate AGC in the presence of the high priority message.

Figure 2:
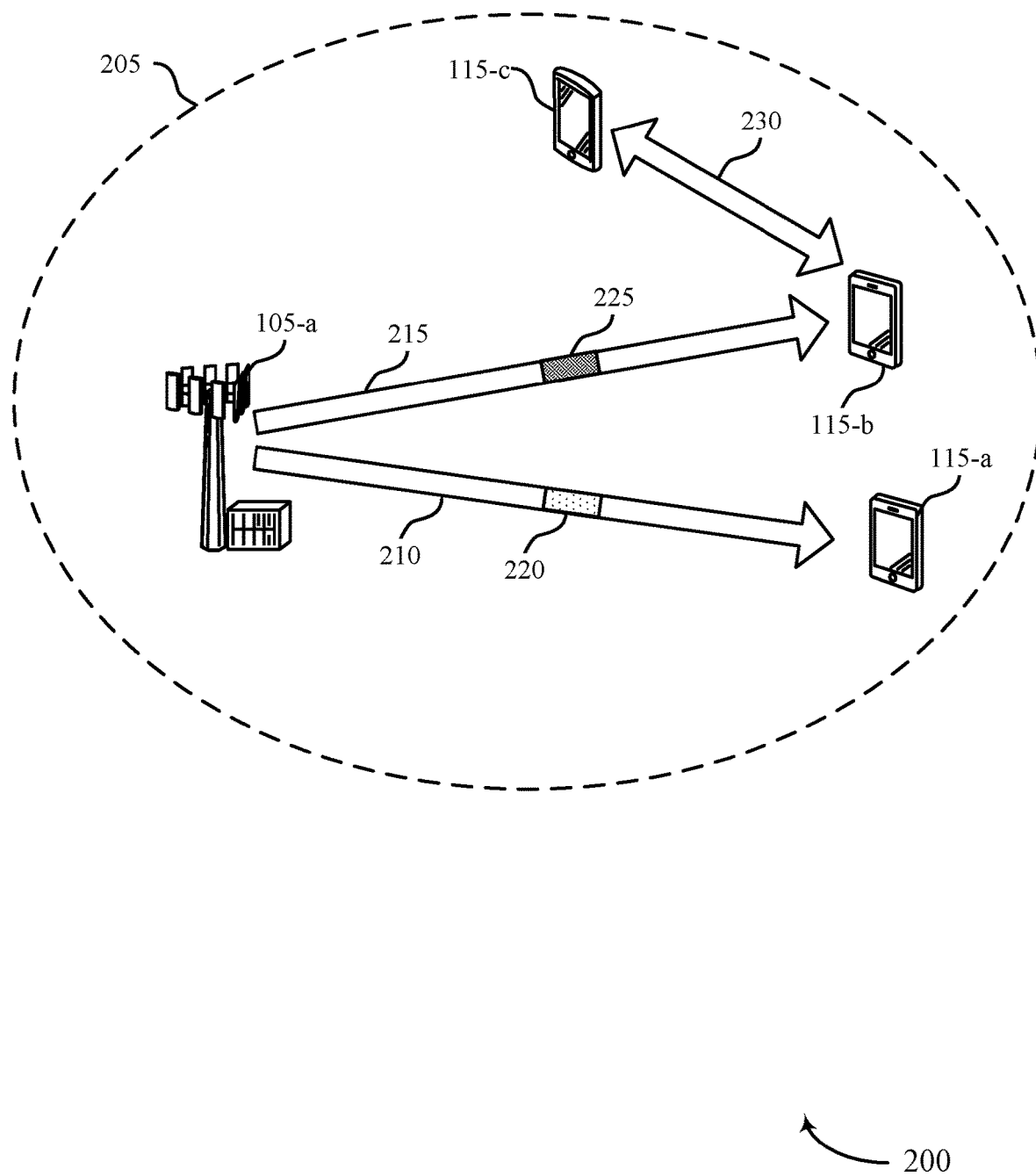
FIG. 2 illustrates an example of a wireless communications system that supports mitigating the impact of uplink or sidelink cancellation in accordance with aspects of the present disclosure.

FIG. 2 illustrates an example of a wireless communications system 200 that supports mitigating the impacts of uplink or sidelink cancellation in accordance with aspects of the present disclosure. The wireless communications system 200 includes a UE 115-a, a UE 115-b, a UE 115-c, and a base station 105-a, which may be examples of corresponding devices as described with reference to FIG. 1. The UE 115-a, the UE 115-b, and the UE 115-c may reside within a geographic coverage area 205 corresponding to the base station 105-a. The base station 105-a may communicate with the UE 115-*a* via a communication link 210; likewise, the base station 105-*a* may communicate with the UE 115-*b* via a communication link 215. In some examples, the UE 115-*b* may communicate with the UE 115-*c* via a sidelink 230. In the discussion that follows, with respect to FIGS. 2-6, it is important to note that, although specific examples are contemplated below, any multitude of techniques, devices, and signaling may be used to implement one or more aspects of the present disclosure.

The base station 105-*a* may schedule resources for the UEs 115-*a* and 115-*b* to transmit and receive messages over the communication link 210 and the communication link 215, respectively. For example, the communication link 210 and the communication link 215 may be examples of physical uplink shared channels (PUSCHs) and may support low priority eMBB communications, high priority URLLC communications, or both.

Additionally, in some examples, the base station 105-*a* may utilize the communication link 215 to assign resources to be used for communications via the sidelink 230 between the UE 115-*b* and the UE 115-*c*. For example, the base station 105-*a* may indicate granted resources to the UE 115-*b* that the UE 115-*b* may use to transmit a message via the sidelink 230 to the UE 115-*c*; the resources assigned by the base station 105-*a* may include resources on a physical sidelink shared channel (PSSCH), resources on a physical sidelink control channel (PSCCH), or both. For example, in some radio access technologies (RATs) such as new radio (NR), PSSCH and PSCCH uplink resources may be indicated to the UE 115-*b* via a downlink control information (DCI) 3_0 message.

In some cases, the base station 105-*a* may determine that a high priority transmission (e.g., URLLC) is awaiting transmission at the UE 115-*a*. In some examples, the base station 105-*a* may determine to reassign previously scheduled resources, such as resources scheduled for a lower priority transmission (e.g., eMBB), to the high priority transmission. For example, the base station 105-*a* may determine that reallocating PUSCH resources previously assigned for eMBB communications at a UE 115, such as the UE 115-*b*, may result in the lowest latency achievable for the pending URLLC transmission. That is, the base station 105-*a* may have previously scheduled PUSCH resources to be used for an eMBB transmission at the UE 115-*b*, but may determine that the eMBB transmission should be canceled so that the URLLC transmission may instead use the PUSCH resources. For example, the URLLC transmission may have a lower latency threshold than the eMBB transmission and may need to be transmitted sooner than the eMBB transmission.

Upon determining the PUSCH resources for reassignment in support of the uplink URLLC transmission, the base station 105-*a* may transmit a cancellation indicator (CI) 225 to the UE 115-*b* to indicate that the UE 115-*b* is to cancel at least a portion of a transmission associated with the reassigned resources. Additionally or alternatively, in some examples, the base station 105-*a* reassign PUSCH resources previously scheduled for a lower priority transmission at the UE 115-*a* to be used for the URLLC transmission at the UE 115-*a*; in such cases, the base station 105-*a* may transmit a CCI 220 to the UE 115-*a* to indicate the reassignment. The CI 220 and the CI 225 may be examples of uplink cancellation indicators (ULCIs). In some examples, the CI 220 and the CI 225 may be transmitted by the base station 105-*a* via a group common-PDCCH DCI 2_4 using a CI radio network temporary identifier (RNTI). The UE 115 receiving the corresponding CI may cancel at least a portion of a transmission associated with the resources indicated in the CI. For example, the UE 115-*a* may receive the CI 220 and may cancel the lower priority transmission, and may instead transmit the URLLC transmission. The UE 115-*b* may receive the CI 225 and may cancel the previously scheduled eMBB transmission. In some examples, the cancellation may apply to any PUSCH repetitions and sounding reference signals (SRS) scheduled on the indicated resources.

In some cases, the UE 115-*b* receiving the CI 225 may determine not to cancel the transmission associated with the resources indicated by the CI 225. For example, the CI 225 may include an indication of a priority (e.g., an uplinkCancellationPriority) of a transmission that is to use the reassigned resources. The UE 115-*b* may determine that the indicated priority is lower than a priority associated with the transmission from the UE 115-*b*, and may therefore refrain from cancelling the transmission.

In some examples, the base station 105-*a* may determine to cancel a lower priority sidelink transmission in support of a higher priority transmission. For example, the UE 115-*b* may utilize sidelink resources, such as PSSCH resources, PSCCH resources, or both, for sidelink communications with the UE 115-*c*. However, a ULCI may be incapable of cancelling scheduled PSSCH and PSCCH resources. In particular, DCI 2_4 may be unable to indicate a sidelink cancellation. For example, if CI 225 is an example of a ULCI, the CI 225 may not be capable of indicating that the UE 115-*b* and the UE 115-*c* are to cancel low priority sidelink transmissions.

Thus, in some examples, the base station 105-*a* may cancel lower priority sidelink transmissions in support of higher priority transmissions and may transmit a sidelink cancellation indicator (SLCI). The base station 105-*a* may determine to cancel a lower priority sidelink transmission associated with a set of resources in favor of a higher priority transmission and may transmit the CI 225, where the CI 225 is an example of a SLCI. The higher priority transmission may be an example of a sidelink transmission or a Uu transmission. For example, the base station 105-*a* may cancel a lower priority sidelink transmission previously scheduled to be transmitted on the set of resources by the UE 115-*b* (e.g., to the UE 115-*c*). The base station 105-*a* may reassign the resources to a Uu transmission associated with a higher priority, such that the UE 115-*b* may instead use the resources to transmit an uplink message via the communication link 215. Alternatively, the base station 105-*a* may reassign the resources to a sidelink transmission associated with a higher priority and the UE 115-*b* may transmit the higher priority sidelink transmission. In some examples, the canceled lower priority sidelink transmission may be an example of a sidelink retransmission.

In some cases, PUSCH resources and sidelink resources may coexist in a common bandwidth part (BWP). For example, the sidelink resources may overlap in time, and may be close, yet non-overlapping, in frequency with the PUSCH resources. In the example of FIG. 2, the previously scheduled PUSCH eMBB resources that are reallocated via CI 225 may be overlapping in time and adjacent in frequency with sidelink resources scheduled for communications between the UE 115-*b* and the UE 115-*c*. In this example, as the eMBB transmission from the UE 115-*b* is canceled, the URLLC transmission from the UE 115-*a* may be transmitted over the PUSCH resources that overlap in time and are adjacent in frequency with the sidelink resources.

In some cases, however, the URLLC transmission may be transmitted over the PUSCH resources at a higher power, which may lead to automatic gain control (AGC) issues for sidelink communications in the same BWP. For example, the UE 115-*c* may measure a power spectrum of the BWP in which transmissions over the sidelink 230 are to occur. The UE 115-*c* may use the power measurement to determine a setting for its AGC. Typically, the UE 115-*c* may adjust its AGC at the beginning of a slot. However, if a higher priority transmission occurs on resources that overlap in time and are close in frequency to the resources monitored by the sidelink UE, the power spectrum change arising from the higher priority transmission could render obsolete the AGC setting of the UE 115-*c*. The obsolete AGC setting may result in overloaded components, noisy signals, or both for some or all sidelink transmissions within the BWP.

Aspects of the present disclosure describe techniques and signaling to support dynamic reallocation of resources without negatively impacting performance of AGC associated with a sidelink transmission. Specifically, the techniques described herein support the use of CIs in wireless systems that include both PUSCH and sidelink resources within a common BWP. A UE 115 communicating via sidelink may cancel or otherwise modify a sidelink transmission that is scheduled on resources that overlap in time and are adjacent in frequency to resources that have been reallocated from a lower priority transmission to a higher priority transmission. For example, the UE 115-*b* may receive the CI 225 that includes an indication that resources previously scheduled for a lower priority transmission (e.g., at a different UE, such as the UE 115-*a*) are reallocated, such that the lower priority transmission is canceled in favor of a higher priority transmission. The higher priority transmission may be transmitted by the UE 115-*a* on the indicated resources. The UE 115-*b* may determine that the indicated resources overlap in time and are within a same BWP as a sidelink transmission scheduled to be transmitted by the UE 115-*b* via the sidelink 230.

The UE 115-*b* may modify the sidelink transmission based on receiving the CI 225. For example, the UE 115-*b* may cancel the sidelink transmission from an earliest overlapping symbol to the end of a communication slot. Canceling the sidelink transmission may prevent the higher transmit power of the higher priority transmission from interfering with an AGC of the sidelink communications. Additionally or alternatively, the UE 115-*b* may utilize one or more reference signals to adapt the AGC settings to the communications environment created by the higher priority message. For example, the UE 115-*b* may transmit one or more reference signals (e.g., an AGC reference signal, a demodulation reference signal (DMRS)) to the UE 115-*c*, and the UE 115-*c* may recalibrate its AGC based on the one or more reference signals to account for the increased power resulting from the presence of the higher priority transmission from UE 115-*a*. In some examples, the UE 115-*b* may transmit a duplicated symbol, such as a symbol duplicated from a previous symbol or a subsequent symbol, that the UE 115-*c* may use to measure power variation introduced by the higher priority message. In some cases, the UE 115-*b* may utilize a dummy symbol or gap period for at least part of the duration of the higher priority transmission, where the UE 115-*b* may refrain from transmitting the previously scheduled sidelink transmission; in this case, the UE 115-*c* may measure the power variation during the gap period.

FIG. 3A illustrates an example of a ULCI in a communication slot 301 that supports mitigating the impact of uplink or sidelink cancellation in accordance with aspects of the present disclosure. In some examples, the implementation of ULCI in a communication slot 301 may be implemented by aspects of a wireless communications system as described with reference to FIGS. 1 and 2. For example, a base station may transmit a ULCI to a UE to reassign resources supporting low priority communications (e.g., eMBB communications) in support of a higher priority message (e.g., URLLC). It is important to note that, while exemplary messaging and slot locations are illustrated, the described techniques may be implemented in any order, may utilize varying bandwidth sizes, and the like. For example, the ULCI may be readily exchanged with other CIs, such as an SLCI, and the like.

A UE may receive an indication of a set of scheduled resources from a base station, where the resources may be scheduled for a transmission associated with low priority communications. In some cases, the base station may transmit the indication in control signaling, e.g., at the beginning of a communications slot 305-*a*. For example, the base station may transmit an indication of PUSCH resources scheduled via an uplink DCI 310-*a* in support of eMBB uplink transmissions originating at the UE. Based on the uplink DCI 310-*a*, the UE may transmit an eMBB PUSCH communication 320-*a* in a subsequent slot 305-*c*.

In some examples, however, the base station may determine that a relatively higher priority transmission is pending at the UE during a period of time between the uplink DCI 310-*a* and the eMBB PUSCH communication 320-*a*. For example, the base station may determine, prior to a second slot 305-*b*, that a higher priority message (e.g., a URLLC transmission) is pending at the UE. In some cases, the base station may determine to reallocate a portion of the resources previously scheduled for the eMBB PUSCH communication 320-*a* to the pending URLLC transmission, for instance, to support lower latency targets corresponding to the pending URLLC transmission. In other examples, the base station may determine to cancel a portion of the previously scheduled eMBB PUSCH communication 320-*a* to prevent interference with the pending URLLC transmission (e.g., if the resources allocated to the eMBB PUSCH communication 320-*a* overlap with resources allocated to the pending URLLC transmission).

For example, the base station may transmit a ULCI 315-*a* to the UE indicating a portion of the previously scheduled eMBB PUSCH communication 320-*a* to cancel in support of the pending URLLC transmission. The ULCI 315-*a* may indicate the portion to cancel by indicating a set of resources 325-*a*, such that the UE may cancel the portion of the previously scheduled eMBB PUSCH communication 320-*a* associated with the indicated set of resources 325-*a*. Canceling the previously scheduled eMBB PUSCH communication 320-*a* on the set of resources 325-*a* may prevent interference with the pending URLLC transmission.

FIG. 3B illustrates an example of a shared BWP 302 that supports mitigating the impact of uplink or sidelink cancellation in accordance with aspects of the present disclosure. In some examples, the shared BWP 302 may be implemented by aspects of a wireless communications system as described with reference to FIGS. 1 and 2. For example, a first UE may utilize a PUSCH portion of the shared BWP 302 for eMBB communications, while a second UE may utilize a PSSCH portion of the shared BWP 302 for eMBB sidelink communications. It should be noted that, while PUSCH and PSSCH are used as examples in the description that follows, the techniques described are not limited to PUSCH and PSSCH and may be applied to any combination of communication link resources.

To further elucidate aspects of the present disclosure, the shared BWP 302 illustrates an exemplary scenario that may lead to miscalibration of AGC due to reallocated transmissions based on one or more CIs. Specifically, the shared BWP 302 depicts a first resource allocation 330-*a* corresponding to a low priority UE, and a second resource allocation 330-*b* corresponding to a high priority UE. In some examples, the first resource allocation 330-*a* may correspond to an eMBB PSSCH allocation; similarly, the second resource allocation 330-*b* may correspond to an eMBB PUSCH allocation. However, the first resource allocation 330-*a* and the second resource allocation 330-*b* are not limited to such an arrangement, and it should be noted that the aforementioned resource allocations may correspond to any number of available resources of any traffic type. As such, techniques discussed herein remain applicable to any combination of resource allocations.

In some cases, a first UE may utilize a symbol within a granted slot to conduct AGC, where the determined AGC is calibrated according to current channel conditions (e.g., a total power of signals received at a second UE). For example, the first UE may transmit an AGC reference signal during an AGC symbol 315-*b* in a first slot such that received signals in the remaining slots may be normalized, filtered, or both, to enable communication with one or more wireless devices. In addition to normalizing and filtering, the AGC may be calibrated by a UE to ensure the total power of the received signals remains under a predetermined threshold to avoid overloading internal components within the second UE.

In some examples, however, a base station may determine that the second resource allocation 330-*b* may be reallocated or cancelled to enable higher priority transmissions (e.g., one or more URLLC transmissions). For example, the base station may transmit a ULCI to a third UE that may be utilizing the second resource allocation 330-*b*. In some cases, the third UE (i.e., a higher priority UE as determined by the base station) may receive the ULCI during a communication slot. In other examples, the base station may transmit an SLCI to the third UE. The third UE may alter the second resource allocation 330-*b* such that one or more URLLC transmissions may not experience interference. For example, the third UE may cancel a transmission associated with a number of symbols within the second resource allocation 330-*b*. Canceling the number of symbols may result in a canceled slot portion 325-*b* corresponding to symbols which may have caused interference with, or otherwise degraded the quality of, one or more URLLC transmissions.

In some cases, however, as illustrated in FIG. 3B, the first resource allocation 330-*a* and the second resource allocation 330-*b* may be adjacent to one another in frequency and at least partially overlapping in time. As such, the one or more URLLC transmissions, which overlap in time, frequency, or both, with the canceled slot portion 325-*b*, may impact the first resource allocation 330-*a*, for example, if the one or more URLLC transmissions may be transmitted at a higher power than eMBB transmissions.

Specifically, the first UE and the second UE may experience AGC issues during the URLLC transmissions coinciding with the canceled slot portion 325-*b*. For example, since the first UE performed AGC calibration at the beginning of the communication slot in the absence of the one or more URLLC transmission, the AGC calibration at the second UE may not be configured to receive additional power without overloading or experiencing excess noise. Additionally, there may be a relatively high likelihood that a high priority UE (i.e., a UE transmitting one or more URLLC transmissions) may transmit the one or more URLLC transmissions at a relatively higher power during the corresponding canceled slot portion 325-*b*. In such cases, since the first resource allocation 330-*a* and the second resource allocation 330-*b* are adjacent to one another, and since the AGC calibration was performed at the beginning of the slot, the one or more URLLC transmissions may bleed power into a region 320-*b* of the first resource allocation 3030-*a* corresponding to the first and second UE and cause overloading, excess noise, or both.

In accordance with one or more aspects of the present disclosure, the first UE may detect non-overlapping portions of the second resource allocation 330-*b* that may result in power bleed over, ultimately leading to possible AGC issues within the first resource allocation 330-*a*. Based on the detection, the first UE may alter or otherwise cancel portions of the first resource allocation 330-*a* to prevent AGC issues.

Figure 4B:
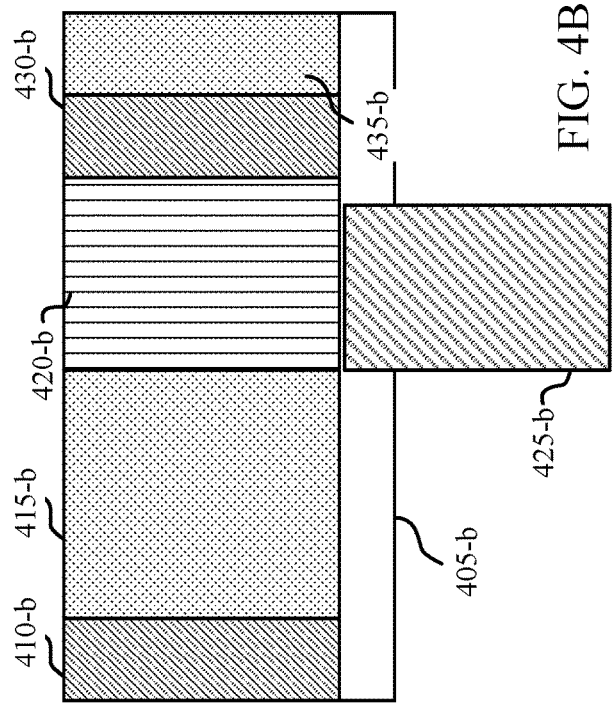
FIGS. 4A, 4B, and 4C illustrate examples of non-overlapping cancellations that support mitigating the impacts of uplink or sidelink cancellations in accordance with aspects of the present disclosure.
Figure 4C:
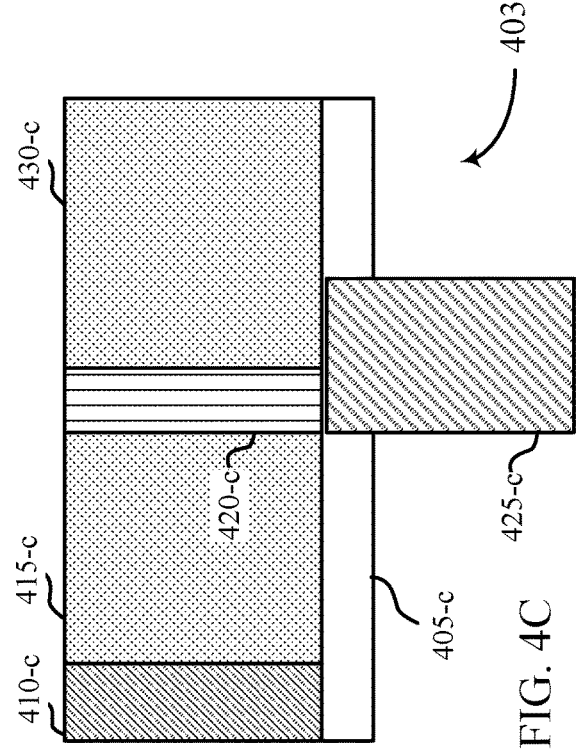
Figure 4A:
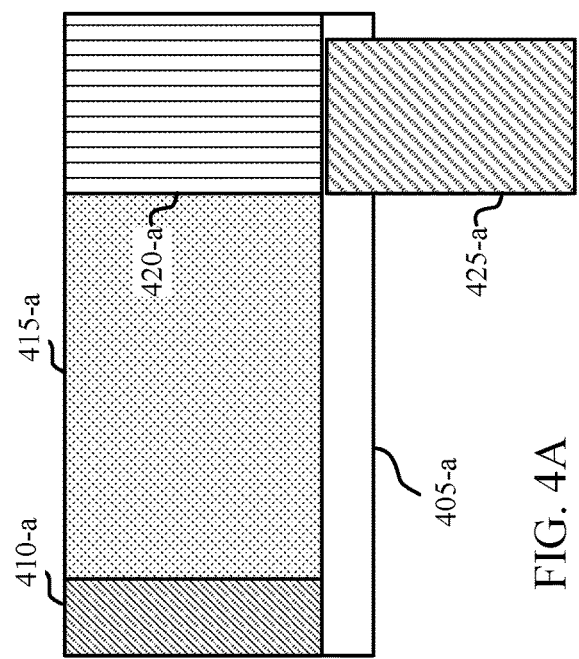

FIG. 4A illustrates an example of a non-overlapping cancellation procedure 401 that supports mitigating the impact of uplink or sidelink cancellation in accordance with aspects of the present disclosure. In some examples, the non-overlapping cancellation procedure 401 may be implemented by one or more aspects of a wireless communications system as described with reference to FIGS. 1 and 2. Additionally, the non-overlapping cancellation procedure 401 may be employed within multiple categories of scenarios, to include those discussed with reference to FIGS. 3A and 3B. For example, if a low priority transmission over a scheduled resource (e.g., eMBB PSSCH resource) is adjacent, yet non-overlapping, in the frequency domain with a second low priority resource (e.g., eMBB PUSCH resource) that is cancelled to support higher priority transmissions (e.g., URLLC transmissions), one or more aspects of the present disclosure may prevent AGC miscalibration that may arise due to power bleeding over from the eMBB PUSCH resource to the eMBB PSSCH resource.

The non-overlapping cancellation procedure 401 exemplifies an aspect of the present disclosure that prevents AGC miscalibration from interfering with sidelink communications at a first UE. For example, the communication slot 405-*a* depicts granted resources to the first UE. The first UE may conduct AGC calibration 410-*a* at the beginning of the slot in preparation for transmissions. For example, the first UE may transmit an AGC symbol in the first symbol of the communication slot 405-*a* to a second UE, enabling the second UE to calibrate AGC in preparation to receive the transmissions from the first UE. Following the AGC calibration 410-*a*, the first UE may perform sidelink communications with the second UE via a first set of resources (e.g., PSSCH resources 415-*a*).

In some examples, a base station may determine a URLLC transmission is pending. To support timely communication of the URLLC transmission, the base station may transmit a CI cancelling low priority (e.g., eMBB) transmissions within a second set of resources 425-*a* in the communication slot 405-*a*. For example, the base station may transmit an SLCI indicating the second set of resources 425-*a*, which may be adjacent in frequency and at least partially overlap in time with the PSSCH resources 415-*a* utilized by the first UE and the second UE.

In some examples, the first UE may detect the non-overlapping second set of resources 425-*a* and determine that the URLLC transmission over the second set of resources 425-*a* may cause AGC issues (e.g., power bleed due to frequency adjacency), i.e., where the AGC settings may fail. For example, the first UE may determine that the URLLC transmission over the second set of resources 425-*a* indicated by the SLCI may result in power bleeding into the PSSCH resources 415-*a* later in the communication slot 405-*a* (i.e., after the AGC calibration 410-*a*). The first UE may therefore cancel transmissions scheduled for the PSSCH resources 415-*a*, for instance, to avoid spill-over of power. Specifically, the first UE may identify one or more symbols within the communication slot 405-*a* that may coincide with the second set of resources 425-*a* in accordance with the SLCI. Based on the identification, the first UE may cancel transmissions associated with the one or more symbols.

For example, the first UE may identify an initial symbol of the second set of resources 425-*a* that overlaps in time with an initial symbol of the PSSCH resources 415-*a*. Based on the identification, the first UE may cancel the transmission of at least a portion 420-*a* of the sidelink communications over the PSSCH resources 415-*a* that coincides with the second set of resources 425-*a*. In some cases, the first UE may cancel resources from an initial symbol of the PSSCH resources 415-*a* to a last symbol in the communication slot 405-*a* that includes the second set of resources 425-*a*.

In another example, the first UE may determine if a size of a resource block allocation of the PSSCH resources 415-*a* within a BWP satisfies a BWP allocation threshold. If the BWP allocation threshold is satisfied, the first UE may cancel at least the portion 420-*a* of the transmission. Additionally or alternatively, the first UE may determine to cancel at least the portion 420-*a* of the transmission over the second set of resources if the second set of resources are within a threshold frequency range and a threshold number of symbols of the PSSCH 415-*a* resources.

FIG. 4B illustrates an example of a non-overlapping cancellation procedure 402 that supports the compensating for power variation across symbols within a sidelink slot in accordance with one or more aspects of the present disclosure. In some examples, the non-overlapping cancellation procedure 402 may be implemented by one or more aspects of a wireless communications system as described with reference to FIGS. 1 and 2. Additionally, the non-overlapping cancellation procedure 402 may be employed within multiple categories of scenarios, to include those discussed with reference to FIGS. 3A and 3B. For example, if an eMBB PSSCH resource is adjacent, yet non-overlapping, with an eMBB PUSCH resource that is cancelled to support URLLC transmissions, one or more aspects of the present disclosure may prevent AGC miscalibration that may arise due to power spill-over from the eMBB PUSCH resource to the eMBB PSSCH resource.

The non-overlapping cancellation procedure 402 exemplifies an aspect of the present disclosure that prevents AGC miscalibration from interfering with sidelink communications at a first UE. For example, the communication slot 405-*b* depicts granted resources to a first UE. The first UE may conduct AGC calibration 410-*b* at the beginning of the slot in preparation for transmissions. For example, the first UE may transmit an AGC symbol in the first symbol of the communication slot 405-*b* to a second UE, enabling the second UE to calibrate AGC in preparation to receive the transmissions from the first UE. Following the AGC calibration 410-*b*, the first UE may perform sidelink communications with the second UE via the first set of resources (e.g., PSSCH resources 415-*b*).

As discussed with reference to FIG. 4A, a base station may determine a URLLC transmission is pending and transmit a CI indicating a second set of resources 425-*b* within the communication slot 405-*b* to be cancelled in support of the URLLC transmission. The first UE may determine, according to methods and techniques described herein, that resources non-overlapping in frequency and at least partially overlapping in time with the second set of resources 425-*b* may experience power spill-over during the URLLC transmission (e.g., due to a high likelihood of increased transmission power for URLLC), which may result in AGC miscalibration, and thus, increased noise or overloading.

As described in FIG. 4A, the first UE may determine to cancel a portion 420-*b* of PSSCH resources 415-*b* that overlap in time but not in frequency, e.g., to avoid AGC issues. In some cases, however, transmissions over the PSSCH resources 415-*b* may resume on a third set of resources 435-*b* within the same communication slot 405-*b*, for example, that no longer overlap in time with the second set of resources 425-*b* used for the URLLC transmission.

Additionally, in some cases, the first UE may transmit a reference signal 430-*b* to enable AGC recalibration at the second UE to account for varying power during the communication slot 405-*b*, e.g., caused by the URLLC transmission on the second set of resources 425-*b*. In some cases, the first UE may transmit the reference signal 430-*b* as part of the third set of resources 435-*b* within the same communications slot 405-*b* as the PSSCH resources 415-*b*. For example, the first UE may transmit the reference signal 430-*b* in the first symbol of the third set of resources 435-*b*. In some examples, the reference signal 430-*b* may be a dedicated reference signal for AGC and channel estimation or synchronization (e.g., DMRS may be used for AGC) at the second UE. Additionally, or alternatively, the first UE may duplicate a symbol from a previous or subsequent symbol upon resumption of transmissions over the third set of resources 435-*b*, e.g., such that the second UE may use the duplicated symbol to perform AGC.

In some instances, sidelink control information (SCI) may inform the second UE about a transmission configuration corresponding to the third set of resources 435-*b* (i.e., resumed transmissions in the communications slot 405-*b* following the URLLC transmission). In other words, SCI may indicate the resumption of transmissions within the communications slot 405-*b* to the second UE. Alternatively, SCI in a later transmission may inform the second UE about the transmission configuration corresponding to resumed transmissions within the communications slot 405-*b*.

FIG. 4C illustrates an example of a non-overlapping cancellation procedure 403 that supports the compensating for power variation across symbols within a sidelink slot in accordance with one or more aspects of the present disclosure. In some examples, the non-overlapping cancellation procedure 403 may be implemented by one or more aspects of a wireless communications system as described with reference to FIGS. 1 and 2. Additionally, the non-overlapping cancellation procedure 403 may be employed within multiple categories of scenarios, to include those discussed with reference to FIGS. 3A and 3B. For example, if a eMBB PSSCH resource is adjacent, yet non-overlapping, with an eMBB PUSCH resource that is cancelled to support URLLC transmissions, one or more aspects of the present disclosure may prevent AGC miscalibration that may arise due to power spill-over from the eMBB PUSCH resource to the eMBB PSSCH resource.

The non-overlapping cancellation procedure 403 exemplifies yet another aspect of the present disclosure that prevents AGC miscalibration from degrading sidelink communications at a first UE. For example, the communication slot 405-*c* depicts granted resources to the first UE. The first UE may conduct AGC calibration 410-*c* with a second UE at the beginning of the slot in preparation for transmissions.

For example, the first UE may transmit an AGC symbol in the first symbol of the communication slot 405-*c* to the second UE, enabling the second UE to calibrate AGC in preparation to receive the transmissions from the first UE. Following the AGC calibration 410-*c*, the first UE may perform sidelink communications with the second UE via a first set of resources (e.g., PSSCH resources 415-*c*).

A base station may determine a URLLC transmission is pending and transmit a CI (e.g., an SLCI, an ULCI) indicating a second set of resources 425-*c* within the communication slot 405-*c* to be cancelled in support of the URLLC transmission. The first UE may determine, according to methods and techniques described herein, that resources non-overlapping in frequency and at least partially overlapping in time with the second set of resources 425-*c* may experience power spill-over during the URLLC transmission (e.g., due to a high likelihood of increased transmission power for URLLC), which may result in AGC miscalibration, and thus, increased noise or overloading.

In some cases, the first UE may determine to cancel at least a portion of a transmission over the PSSCH resources 415-*c*. In some instances, however, a cancelled portion 420-*c* may not fully overlap in time with the indicated second set of resources 425-*c* corresponding to the URLLC transmission. Instead, the cancelled portion 420-*c* may serve as a measurement gap in support of AGC recalibration in the presence of the URLLC transmission. For example, transmissions over the PSSCH resources 415-*c* may pause for a period of time equivalent to the duration of the canceled portion 420-*c*. In some examples, the first UE may indicate the pause to the second UE as part of SCI. Additionally or alternatively, the SCI may include an indication that triggers AGC refinement during the PSSCH resources 415-*c* (i.e., a second AGC within the communication slot 405-*c*). During the pause, and optionally, based on the AGC refinement trigger, the second UE may perform power measurement of the adjacent URLLC transmission to account for power variability within the slot 405-*c*. Based on the power measurement, the second UE may fine tune AGC.

In some examples, the second UE may receive (e.g., from the first UE) a reference signal during the measurement gap. Based on the measurement gap and the reference signal, the second UE may determine and subsequently apply a refined AGC. For example, the second UE may perform a power measurement of communications transmitted over the PSSCH resources 415-*c*, which may be affected by the presence of the URLLC transmission. Based on the refined AGC, the first UE may resume communications with the second UE over a third set of resources 430-*c* within the same communications slot 405-*c*. In some cases, the first UE may indicate, over SCI, to the second UE, the resumption of transmissions over the third set of resources 430-*c*.

Figure 5:
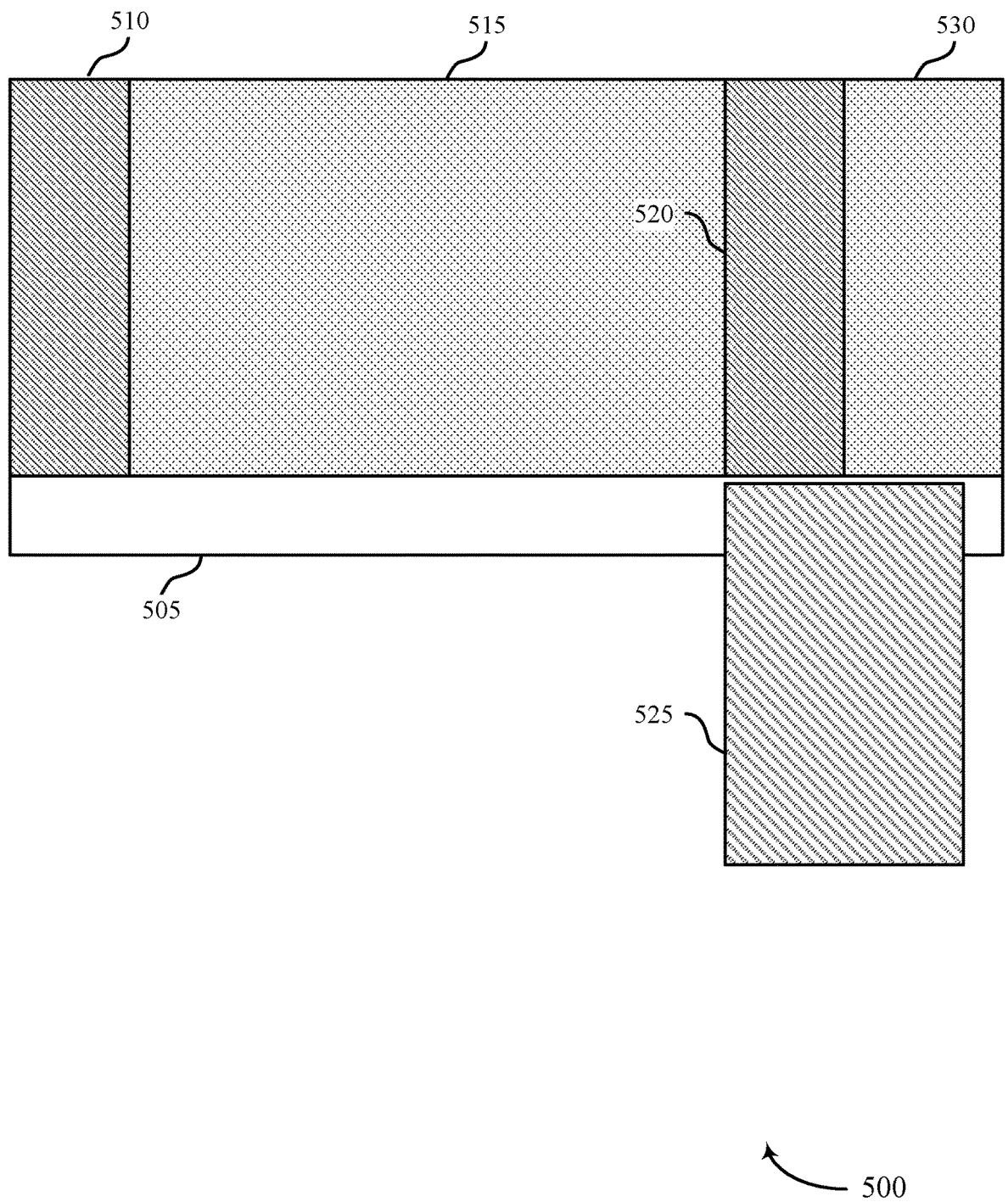
FIG. 5 illustrates an example of a non-overlapping cancellation that supports mitigating the impact of uplink or sidelink cancellation in accordance with aspects of the present disclosure.

FIG. 5 illustrates an example of a non-overlapping cancellation 500 that supports mitigating the impact of uplink or sidelink cancellation in accordance with aspects of the present disclosure. In some examples, the non-overlapping cancellation procedure 500 may be implemented by one or more aspects of a wireless communications system as described with reference to FIGS. 1 and 2. Additionally, the non-overlapping cancellation procedure 500 may be employed within multiple categories of scenarios, to include those discussed with reference to FIGS. 3 and 4. For example, if a low priority resource (e.g., eMBB PSSCH resource) is adjacent, yet non-overlapping, with a second low priority resource (e.g., eMBB PUSCH resource) that is cancelled to support of higher priority transmissions (e.g., URLLC transmissions), one or more aspects of the present disclosure may prevent AGC miscalibration that may arise due to power spill-over from the eMBB PUSCH resource to the eMBB PSSCH resource.

The non-overlapping cancellation procedure 500 exemplifies yet another aspect of the present disclosure that prevents AGC miscalibration from degrading sidelink communications at a first UE. For example, the communication slot 505 depicts granted resources to the first UE. The first UE may conduct AGC calibration 510 at the beginning of the slot in preparation for transmissions. For example, the first UE may transmit an AGC symbol in the first symbol of the communication slot 505 to a second UE, enabling the second UE to calibrate AGC in preparation to receive the transmissions from the first UE. Following the AGC calibration 510, the first UE may perform sidelink communications with the second UE via a first set of resources (e.g., PSSCH resources 515).

A base station may determine a URLLC transmission is pending and transmit a CI indicating a second set of resources 525 within the communication slot 505, where transmissions over the second set of resources 525 are to be cancelled in support of the URLLC transmission. The first UE may determine, according to methods and techniques described herein, that resources non-overlapping in frequency and at least partially overlapping in time with the second set of resources 525 may experience power spill-over during the URLLC transmission (e.g., due to a high likelihood of increased transmission power for URLLC), which may result in AGC miscalibration, and thus, increased noise or overloading.

The first UE may determine, based on the CI and the indicated second set of resources 525 within the communication slot 505, to alter one or more aspects of the PSSCH resources 515. For example, the first UE may identify an initial symbol 520 of the PSSCH resources 515 that overlaps in time with an initial symbol of the second set of resources 525. The first UE may transmit, over the symbol 520, a communication for AGC determination. In other words, the first UE may transmit a symbol at the beginning of the URLLC transmission to initiate an AGC recalibration with the second UE. In some cases, the communication for the AGC determination transmitted in the symbol 520 may be a duplicate of either a previous symbol or a subsequent symbol within the communication slot 505. In other cases, the communication for the AGC determination may be a reference signal or a dedicated AGC symbol.

In some examples, the first UE may rearrange scheduled communications in the slot 505 in order to transmit the communication for the AGC determination in the symbol 520. For example, the first UE may determine that the symbol 520 is scheduled for transmission of a data signal and not a reference signal (e.g., a DMRS). The first UE may identify a DMRS that is scheduled to be transmitted during a symbol of the PSSCH resources 515 that is different from the symbol 520. That is, the DMRS may not align with the symbol 520 because the symbol 520 may be scheduled for a data transmission. In such cases, the first UE may swap (i.e., shuffle) the data signal with the DMRS such that the DRMS is transmitted during the symbol 520.

Additionally, in some examples, the first UE may transmit an indication of a symbol index associated with the DMRS, e.g., as part of SCI. For instance, if the UE swaps a data signal with a DMRS to transmit the DMRS during the symbol 520, the first UE may transmit an indication of the symbol index based on the swapping. The symbol 520 may have a symbol index of 4 while the DMRS may have been scheduled to be transmitted in a symbol with a symbol index of 6. The first UE may move the DMRS to the symbol 520 associated with the symbol index of 4. The first UE may inform the second UE via SCI of the swap, for instance, by indicating the symbol index originally associated with the DMRS (e.g., 6), the symbol index associated with the symbol 520 (e.g., 4), or both, as part of SCI. In some cases, the DMRS sequence generation may be associated with the symbol index, and the first UE may keep the association with the original symbol index (e.g., 6) or the swapped symbol index (e.g., 4). The behavior of both the first UE and the second UE within the context of the AGC determination may be aligned via signaling in SCI or included in a CI (e.g., SLCI) transmitted to both the first UE and the second UE.

The second UE may receive communication for the AGC determination in the symbol 520 and may perform the AGC determination. Based on the AGC determination communication, the second UE may recalibrate AGC in the presence of the URLLC transmission. Following the AGC determination, e.g., after the symbol 520, the first UE may indicate, via SCI, a resumption of transmissions over the third set of resources 530 to the second UE during the communication slot 505. Based on the SCI, the first UE may resume communications with the second UE using the third set of resources 530, where the second UE may utilize the recalibrated AGC that accounts for power variation introduced by URLLC traffic.

Figure 6:
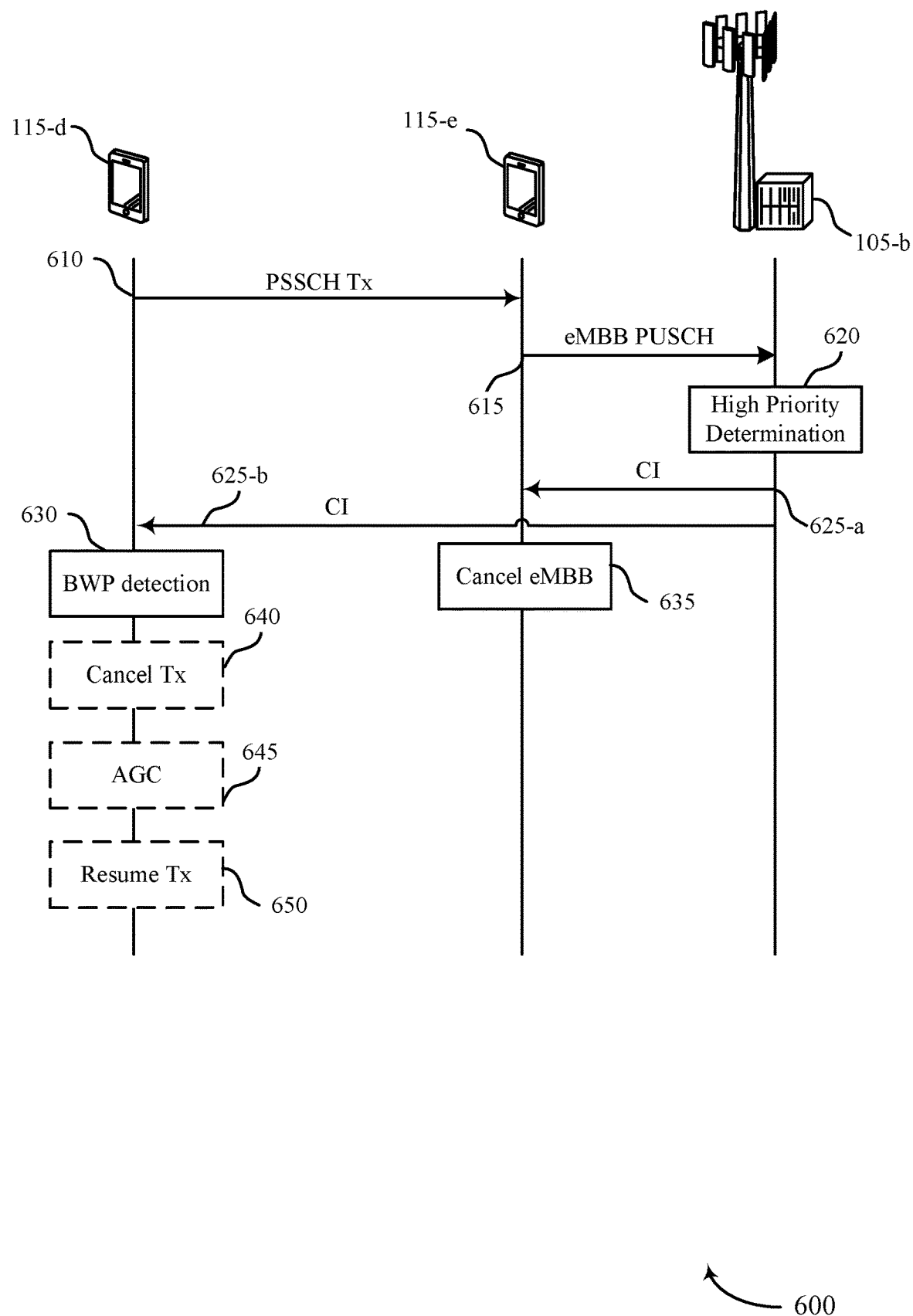
FIG. 6 illustrates an example of a process flow that supports mitigating the impact of uplink or sidelink cancellation in accordance with aspects of the present disclosure.

FIG. 6 illustrates an example of a process flow 600 that supports mitigating the impact of uplink or sidelink cancellation in accordance with aspects of the present disclosure. In some examples, the process flow 600 may be implemented by one or more aspects of a wireless communications system as described with reference to FIGS. 1-5. For example, a UE 115-*d*, a UE 115-*e*, and a base station 105-*b* may be examples of corresponding devices as described with reference to FIG. 1 Additionally, the process flow 600 may be employed within multiple categories of scenarios, to include those discussed with reference to FIGS. 3-5. For example, if a low priority resource (e.g., an eMBB PSSCH resource) assigned to the UE 115-*d* is adjacent, yet non-overlapping, with a second low priority resource (e.g., an eMBB PUSCH resource) assigned to the UE 115-*e* that is cancelled to support higher priority transmissions (e.g., URLLC transmissions), one or more aspects of the present disclosure may prevent AGC miscalibration that may arise due to power spill-over from the eMBB PUSCH resource to the eMBB PSSCH resource.

At 610, the UE 115-*d* may transmit a sidelink message on granted PSSCH resources to the UE 115-*e*. In some examples, the transmissions on the granted PSSCH resources may be low priority (e.g., eMBB).

At 615, the UE 115-*e* may transmit one or more low priority transmissions over granted PUSCH resources to the base station 105-*b*.

At 620, the base station 105-*b* may determine a high priority message is pending (e.g., a URLLC transmission). The base station may determine to reallocate at least a portion of the PUSCH resources utilized by the UE 115-*e* to support the URLLC transmission.

At 625-*a* and at 625-*b*, the base station may transmit a CI (e.g., a ULCI) to the UE 115-*e* and the UE 115-*d*, respectively. The CI may indicate that the UE 115-*e* is to cancel transmissions over a first set of resources, e.g., such that the first set of resources may be reallocated for the URLLC transmission. In some examples, the CI transmitted at 625-*a* and 625-*b* may be an example of an SLCI or a ULCI.

At 630, the UE 115-*d* may detect or otherwise identify that the UE 115-*d* is scheduled to communicate via sidelink communications over a second set of resources (e.g., PSSCH resources), where the second set of resources may at least partially overlap in time with and may be within a same BWP (e.g., but may cover a different frequency range) as the first set of resources indicated in the CI received at 625-*b*. That is, the UE 115-*d* may detect the BWP associated with the URLLC transmission as compared to the BWP utilized by the sidelink communications.

In some examples, the UE 115-*d* may determine if a size of a resource block allocation of the first set of resources within the BWP satisfies a BWP allocation threshold. In some cases, the UE 115-*d* may determine if the second set of resources are within a threshold frequency range and a threshold number of symbols of the first set of resources.

At 635, the UE 115-*e* may cancel transmissions over the first set of resources indicated by the CI at 625-*a*.

If, at 630, the UE 115-*d* determines that the first set of resources and the second set of resources overlap in time, even if they are non-overlapping in frequency, the UE 115-*d* may modify sidelink communications over the second set of resources, for instance, based on receiving the CI at 625-*b*. For example, at 640, the UE 115-*d* may cancel transmission of at least a portion of the sidelink communications over the second set of resources. As another example, the UE 115-*d* may cancel transmission of at least a portion of the sidelink communications if, at 630, the UE 115-*d* determines that the BWP threshold is satisfied. In some examples, the second set of resources (i.e., over which the portion of the sidelink communications is canceled) may be within a threshold frequency range and a threshold number of symbols of the first set of resources, e.g., as determined by the UE 115-*d* at 630.

In some examples, the UE 115-*d* may cancel the transmissions over the second set of resources by identifying a first symbol of the second set of resources that overlaps in time with a first symbol of the first set of resources. The UE 115-*d* may determine that the second set of transmissions (e.g., corresponding to the canceled transmissions) extends from an initial symbol of the first set of resources to a last symbol in a slot, where the slot includes the second set of resources.

At 645, the UE 115-*d* may optionally support or perform AGC determination. The UE 115-*d* may support or perform AGC determination in addition to or alternatively to canceling transmissions at 640. For example, the UE 115-*d* may be an example of a transmitting sidelink UE and may support AGC determination performed at a receiving sidelink UE. The UE 115-*d* may identify a first symbol of the second set of resources that overlaps in time with a first symbol of the first set of resource and may transmit a communication (e.g., a reference signal, a duplicate of a previous symbol, a duplicate of a subsequent symbol) for AGC determination over the first symbol. In some cases, the communication may be a DMRS. In some examples, the UE 115-*d* may determine that a DMRS is scheduled to be transmitted during a symbol other than the first symbol and that a data signal is scheduled to be transmitted during the first symbol. The UE 115-*d* may swap the data signal with the DMRS to transmit the DMRS on the first symbol and may transmit an indication (e.g., as part of SCI or a cancellation indication) of a symbol index associated with the DMRS. The symbol index may be based on a generated DMRS sequence.

In some examples, the UE 115-*d* may be an example of a receiving sidelink UE and may perform AGC determination at 645. For example, the UE 115-*d* may identify a first symbol of the second set of resources that overlaps in time with a first symbol of the first set of resource and may receive a communication (e.g., a reference signal, a duplicate of a previous symbol, a duplicate of a subsequent symbol) for AGC determination over the first symbol. Additionally, or alternatively, the UE 115-d may receive a reference signal during a gap, where the gap is defined by the second set of resources and may extend to at least a last symbol of the first set of resources. The UE 115-d may perform AGC determination based on receiving the reference signal and may apply the AGC to sidelink communications received after the gap period and within a same slot as the second set of resources. In some cases, the UE 115-d may perform power measurement of communications transmitted over the first set of resources, for instance, during the gap period. The UE 115-d may refine AGC during the gape period and may apply the refined AGC to sidelink communications received after the gap period and within a same slot as the second set of resources.

At 650, the UE 115-d may optionally resume transmission of the sidelink communications. For example, after canceling transmission of a first portion of the sidelink communications over the second set of resources at 640, the UE 115-d may transmit a second portion of the sidelink communications over a third set of resources. The third set of resources may be subsequent in time to and within a same slot as the second set of resources. Additionally, in some examples, the UE 115-d may transmit a reference signal (e.g., a DMRS, a dedicated AGC reference signal), a duplication of a previous symbol communication, a duplication of a subsequent symbol communication, or some combination thereof, over one or more initial symbols of the third set of resources.

In some cases, the UE 115-d may indicate, as part of SCI, that the sidelink communications are resumed or are to be resumed, for example, via transmission of the second portion of the sidelink communications over the third set of resources. In some cases, the UE 115-d may transmit the SCI that includes an indication that triggers AGC refinement, for instance, during the second set of resources.

In some examples, if the UE 115-d is a receiving sidelink UE, the UE 115-d may receive resumed transmissions and perform AGC at 650. For instance, the UE 115-d may receive the indication that the sidelink communications are to be resumed and may receive the second portion of the sidelink communications over the third set of resources. In such examples, based on the resumed transmissions, the UE 115-d may receive the reference signal for AGC determination over the first symbol of the third set of resources and may perform AGC determination accordingly. Additionally or alternatively, the UE 115-d may receive a duplication of a previous symbol communication or a duplication of a subsequent symbol communication. In some cases, the UE 115-d may receive SCI indicating the resumption of the sidelink communications and/or SCI including an indication that triggers AGC refinement.

Figure 7:
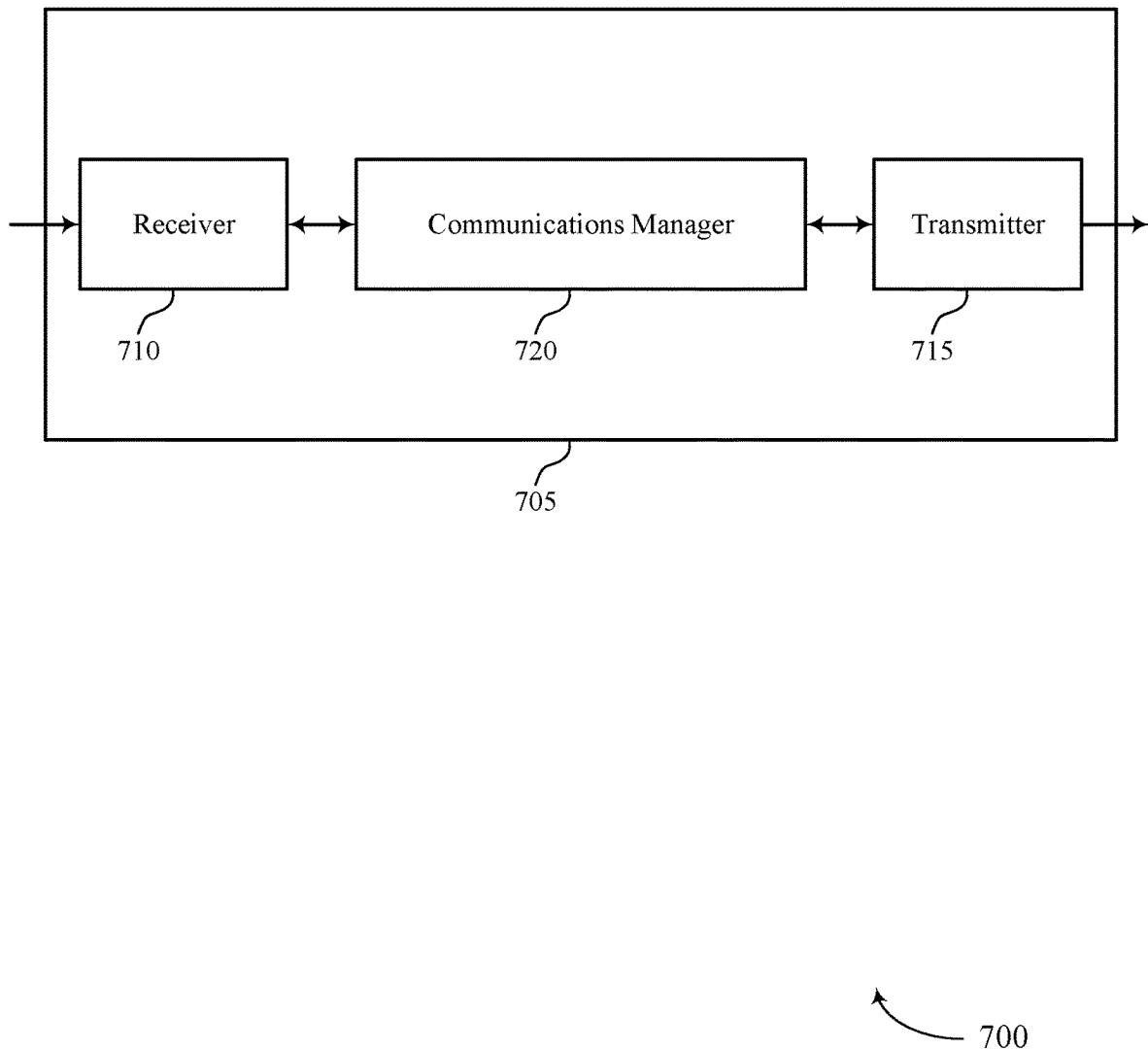
FIGS. 7 and 8 show block diagrams of devices that support mitigating the impact of uplink or sidelink cancellation in accordance with aspects of the present disclosure.

FIG. 7 shows a block diagram 700 of a device 705 that supports mitigating the impact of uplink or sidelink cancellation in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to mitigating the impact of uplink or sidelink cancellation). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to mitigating the impact of uplink or sidelink cancellation). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of mitigating the impact of uplink or sidelink cancellation as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a first UE in accordance with examples as disclosed herein. For example, the communications manager 720 may be configured as or otherwise support a means for receiving, at the first UE, a cancellation indicator instructing a second UE to cancel transmissions over a first set of resources. The communications manager 720 may be configured as or otherwise support a means for identifying that the first UE is scheduled to communicate via sidelink communications over a second set of resources that at least partially overlap in time with the first set of resources, the second set of resources being within a same BWP as the first set of resources but covering a different frequency range than the first set of resources. The communications manager 720 may be configured as or otherwise support a means for modifying at least a portion of the sidelink communications over the second set of resources based on receipt of the cancellation indicator pertaining to the first set of resources.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for reduced processing and power consumption. Particularly, methods discussed herein to dynamically cancel sidelink transmissions or dynamically perform AGC determination and refinement may prevent AGC issues arising and subsequently degrading transmissions. By preventing the degradation of transmissions, the number of retransmissions may be decreased, thus saving processing resources and reducing power consumption, along with overall signaling overhead.

Figure 8:
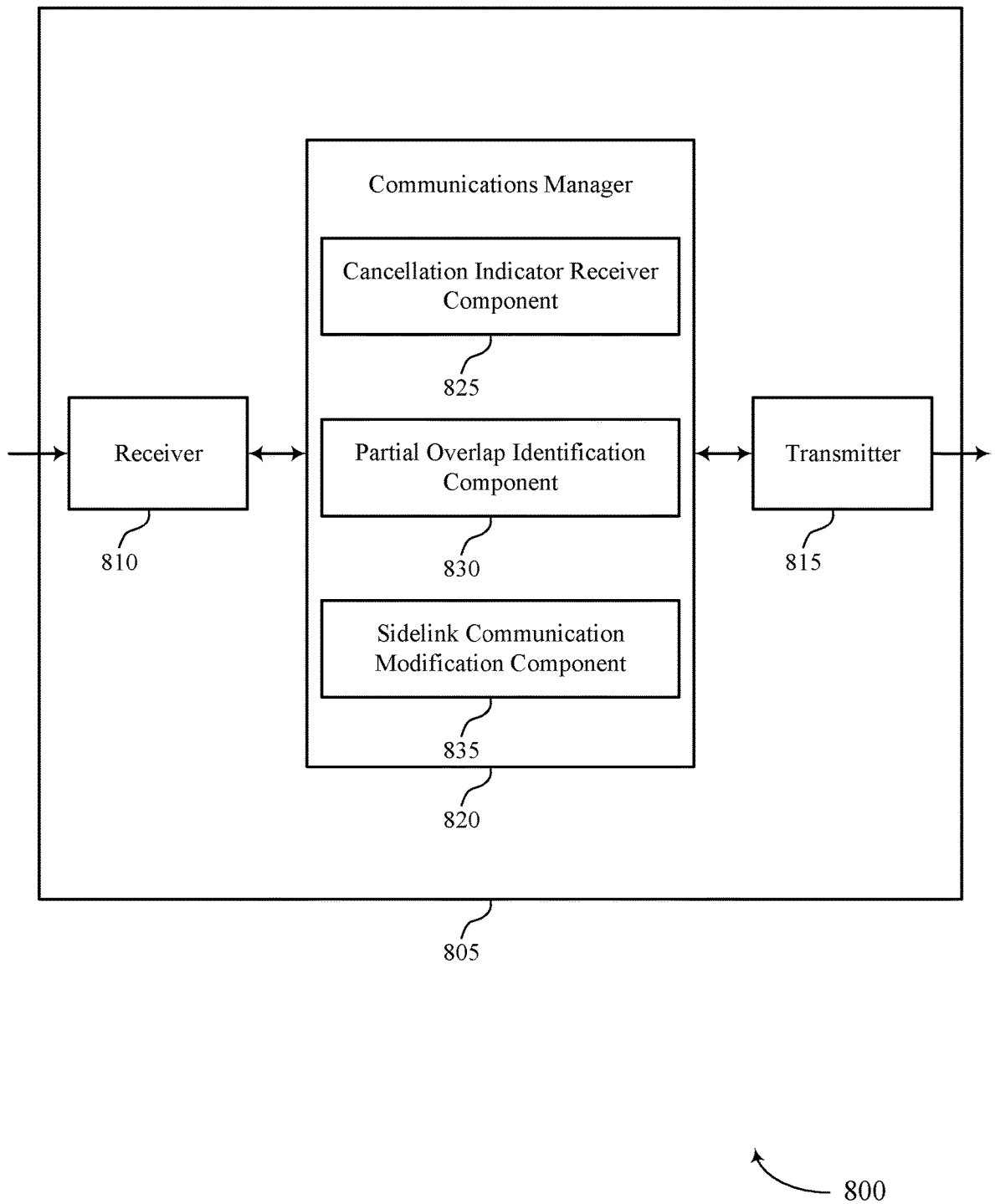

FIG. 8 shows a block diagram 800 of a device 805 that supports mitigating the impact of uplink or sidelink cancellation in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to mitigating the impact of uplink or sidelink cancellation). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to mitigating the impact of uplink or sidelink cancellation). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of mitigating the impact of uplink or sidelink cancellation as described herein. For example, the communications manager 820 may include a cancellation indicator receiver component 825, a partial overlap identification component 830, a sidelink communication modification component 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a first UE in accordance with examples as disclosed herein. The cancellation indicator receiver component 825 may be configured as or otherwise support a means for receiving, at the first UE, a cancellation indicator instructing a second UE to cancel transmissions over a first set of resources. The partial overlap identification component 830 may be configured as or otherwise support a means for identifying that the first UE is scheduled to communicate via sidelink communications over a second set of resources that at least partially overlap in time with the first set of resources, the second set of resources being within a same BWP as the first set of resources but covering a different frequency range than the first set of resources. The sidelink communication modification component 835 may be configured as or otherwise support a means for modifying at least a portion of the sidelink communications over the second set of resources based on receipt of the cancellation indicator pertaining to the first set of resources.

Figure 9:
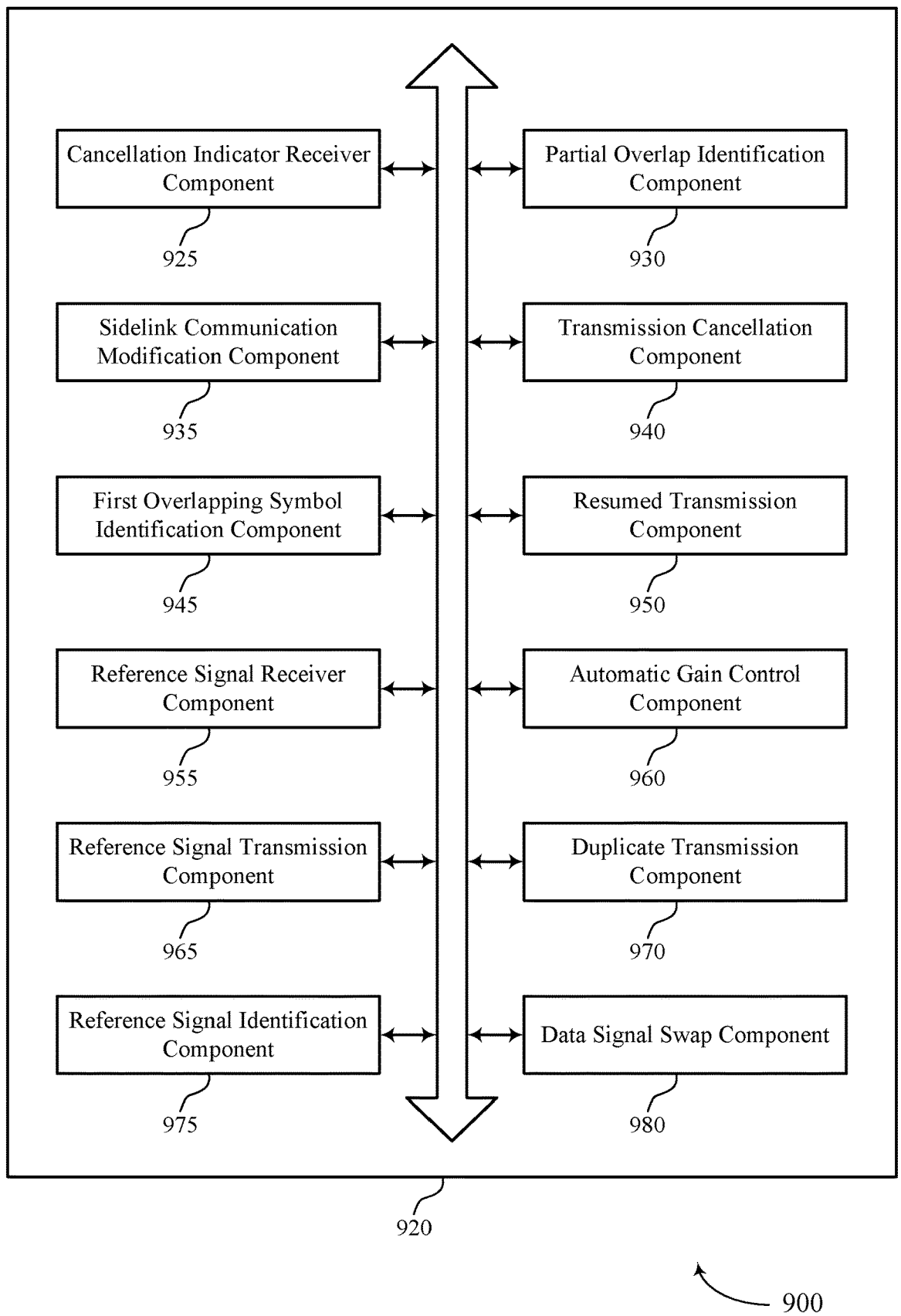
FIG. 9 shows a block diagram of a communications manager that supports mitigating the impact of uplink or sidelink cancellation in accordance with aspects of the present disclosure.

FIG. 9 shows a block diagram 900 of a communications manager 920 that supports mitigating the impact of uplink or sidelink cancellation in accordance with aspects of the present disclosure. The communications manager 920 may be an example of aspects of a communications manager 720, a communications manager 820, or both, as described herein. The communications manager 920, or various components thereof, may be an example of means for performing various aspects of mitigating the impact of uplink or sidelink cancellation as described herein. For example, the communications manager 920 may include a cancellation indicator receiver component 925, a partial overlap identification component 930, a sidelink communication modification component 935, a transmission cancellation component 940, a first overlapping symbol identification component 945, a resumed transmission component 950, a reference signal receiver component 955, an automatic gain control component 960, a reference signal transmission component 965, a duplicate transmission component 970, a reference signal identification component 975, a data signal swap component 980, or any combination thereof. Each of these components may communicate, directly or indirectly, with one another (e.g., via one or more buses).

The communications manager 920 may support wireless communications at a first UE in accordance with examples as disclosed herein. The cancellation indicator receiver component 925 may be configured as or otherwise support a means for receiving, at the first UE, a cancellation indicator instructing a second UE to cancel transmissions over a first set of resources. The partial overlap identification component 930 may be configured as or otherwise support a means for identifying that the first UE is scheduled to communicate via sidelink communications over a second set of resources that at least partially overlap in time with the first set of resources, the second set of resources being within a same BWP as the first set of resources but covering a different frequency range than the first set of resources. The sidelink communication modification component 935 may be configured as or otherwise support a means for modifying at least a portion of the sidelink communications over the second set of resources based on receipt of the cancellation indicator pertaining to the first set of resources.

In some examples, to support modifying at least the portion of the sidelink communications over the second set of resources, the transmission cancellation component 940 may be configured as or otherwise support a means for canceling transmission of at least a portion of the sidelink communications over the second set of resources.

In some examples, the transmission cancellation component 940 may be configured as or otherwise support a means for determining that a size of a resource block allocation of the first set of resources within the BWP satisfies a BWP allocation threshold, where canceling at least the portion of the transmission is based on the BWP allocation threshold being satisfied.

In some examples, to support modifying at least the portion of the sidelink communications over the second set of resources, the transmission cancellation component 940 may be configured as or otherwise support a means for canceling transmission of at least a portion of the sidelink communications over the second set of resources, where the second set of resources are within a threshold frequency range of the first set of resources and a threshold number of symbols of the first set of resources.

In some examples, to support modifying at least the portion of the sidelink communications over the second set of resources, the first overlapping symbol identification component 945 may be configured as or otherwise support a means for identifying a first symbol of the second set of resources that overlaps in time with a first symbol of the first set of resources. In some examples, to support modifying at least the portion of the sidelink communications over the second set of resources, the transmission cancellation component 940 may be configured as or otherwise support a means for canceling transmission of at least a portion of the sidelink communications over the second set of resources, where the second set of resources extends from an initial symbol of the first set of resources to a last symbol in a slot that includes the second set of resources.

In some examples, to support modifying at least the portion of the sidelink communications over the second set of resources, the transmission cancellation component 940 may be configured as or otherwise support a means for canceling transmission of at least a first portion of the sidelink communications over the second set of resources. In some examples, to support modifying at least the portion of the sidelink communications over the second set of resources, the resumed transmission component 950 may be configured as or otherwise support a means for transmitting a second portion of the sidelink communications over a third set of resources that is subsequent to the second set of resources in time and within a same slot as the second set of resources.

In some examples, the reference signal transmission component 965 may be configured as or otherwise support a means for transmitting, over one or more initial symbols of the third set of resources, a reference signal for automatic gain control determination. In some examples, the reference signal is a DMRS or a dedicated automatic gain control reference signal. In some examples, the duplicate transmission component 970 may be configured as or otherwise support a means for transmitting, over an initial symbol of the third set of resources, a communication that is a duplicate of either a previous symbol communication or a subsequent symbol communication.

In some examples, the resumed transmission component 950 may be configured as or otherwise support a means for transmitting SCI that includes an indication that the sidelink communications are resumed or to be resumed via transmission of the second portion of the sidelink communications over the third set of resources.

In some examples, the automatic gain control component 960 may be configured as or otherwise support a means for transmitting SCI that includes an indication that triggers automatic gain control refinement during the second set of resources. In some examples, to support modifying at least the portion of the sidelink communications over the second set of resources, the reference signal receiver component 955 may be configured as or otherwise support a means for receiving a reference signal during a gap period defined by the second set of resources, the gap period extending to at least a last symbol of the first set of resources. In some examples, to support modifying at least the portion of the sidelink communications over the second set of resources, the automatic gain control component 960 may be configured as or otherwise support a means for determining an automatic gain control based on receipt of the reference signal. In some examples, to support modifying at least the portion of the sidelink communications over the second set of resources, the automatic gain control component 960 may be configured as or otherwise support a means for applying the automatic gain control to reception of the sidelink communications transmitted after the gap period and within a same slot as the second set of resources.

In some examples, to support modifying at least the portion of the sidelink communications over the second set of resources, the automatic gain control component 960 may be configured as or otherwise support a means for performing a power measurement of communications transmitted over the first set of resources during a gap period defined by the second set of resources. In some examples, to support modifying at least the portion of the sidelink communications over the second set of resources, the automatic gain control component 960 may be configured as or otherwise support a means for refining automatic gain control during the gap period. In some examples, to support modifying at least the portion of the sidelink communications over the second set of resources, the automatic gain control component 960 may be configured as or otherwise support a means for applying a refined automatic gain control to reception of the sidelink communications transmitted after the gap period and within a same slot as the second set of resources, the reception of the sidelink communications overlapping in time, at least partially, with the first set of resources.

In some examples, the resumed transmission component 950 may be configured as or otherwise support a means for receiving SCI that includes an indication that the sidelink communications are resumed or to be resumed via transmission of the second portion of the sidelink communications after the gap period. In some examples, the indication triggers the power measurement and automatic gain control refinement during the gap period.

In some examples, to support modifying at least the portion of the sidelink communications over the second set of resources, the first overlapping symbol identification component 945 may be configured as or otherwise support a means for identifying a first symbol of the second set of resources that overlaps in time with an initial symbol of the first set of resources. In some examples, to support modifying at least the portion of the sidelink communications over the second set of resources, the reference signal transmission component 965 may be configured as or otherwise support a means for transmitting, over the first symbol of the second set of resources, a communication for automatic gain control determination. In some examples, to support modifying at least the portion of the sidelink communications over the second set of resources, the resumed transmission component 950 may be configured as or otherwise support a means for transmitting the sidelink communications after the first symbol and during a remaining portion of the second set of resources.

In some examples, the communication for automatic gain control determination is a duplicate of either a previous symbol communication or a subsequent symbol communication. In some examples, the communication for automatic gain control determination is a reference signal.

In some examples, the reference signal identification component 975 may be configured as or otherwise support a means for identifying that a DMRS is scheduled to be transmitted during a symbol other than the first symbol. In some examples, the reference signal identification component 975 may be configured as or otherwise support a means for identifying that the DMRS is the communication for automatic gain control determination. In some examples, the data signal swap component 980 may be configured as or otherwise support a means for swapping a data signal scheduled to be transmitted on the first symbol with the DMRS such that the DMRS is transmitted on the first symbol. In some examples, the reference signal transmission component 965 may be configured as or otherwise support a means for transmitting SCI indicating a symbol index associated with the DMRS, where the symbol index is based on a generated DMRS sequence.

In some examples, the communication for automatic gain control determination is a duplicate of either a previous symbol communication or a subsequent symbol communication. In some examples, the communication for automatic gain control determination is a reference signal.

In some examples, the reference signal receiver component 955 may be configured as or otherwise support a means for receiving, via either SCI or the cancellation indication, an indication that a symbol index associated with a DMRS, where the DMRS is the communication for automatic gain control determination and where the symbol index is based on a generated DMRS sequence.

In some examples, to support modifying at least the portion of the sidelink communications over the second set of resources, the first overlapping symbol identification component 945 may be configured as or otherwise support a means for identifying a first symbol of the second set of resources that overlaps in time with an initial symbol of the first set of resources. In some examples, to support modifying at least the portion of the sidelink communications over the second set of resources, the reference signal receiver component 955 may be configured as or otherwise support a means for receiving, over the first symbol of the second set of resources, a communication for automatic gain control determination. In some examples, to support modifying at least the portion of the sidelink communications over the second set of resources, the resumed transmission component 950 may be configured as or otherwise support a means for receiving the sidelink communications after the first symbol and during a remaining portion of the second set of resources.

Figure 10:
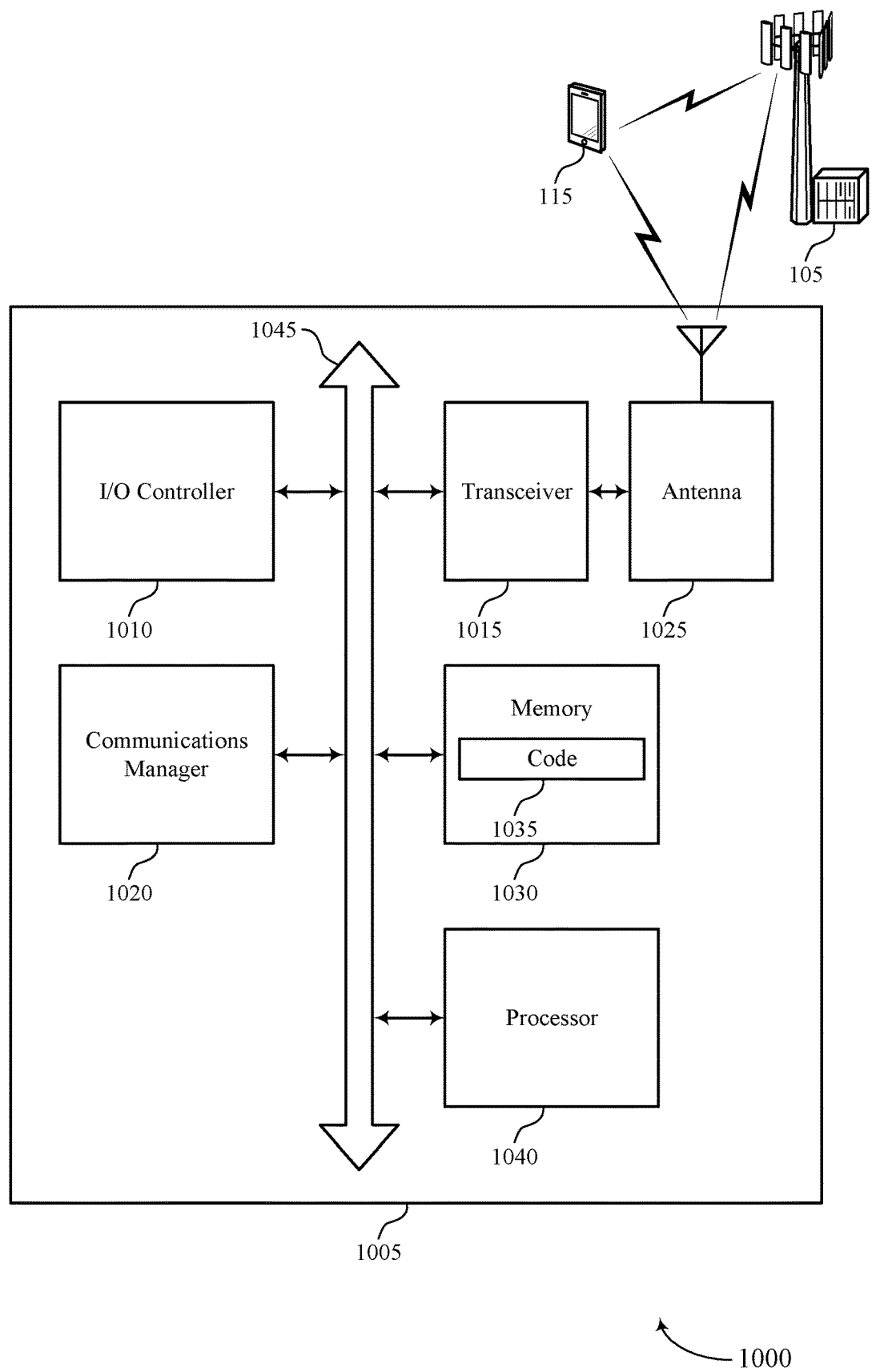
FIG. 10 shows a diagram of a system including a device that supports mitigating the impact of uplink or sidelink cancellation in accordance with aspects of the present disclosure.

FIG. 10 shows a diagram of a system 1000 including a device 1005 that supports mitigating the impact of uplink or sidelink cancellation in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting mitigating the impact of uplink or sidelink cancellation). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at a first UE in accordance with examples as disclosed herein. For example, the communications manager 1020 may be configured as or otherwise support a means for receiving, at the first UE, a cancellation indicator instructing a second UE to cancel transmissions over a first set of resources. The communications manager 1020 may be configured as or otherwise support a means for identifying that the first UE is scheduled to communicate via sidelink communications over a second set of resources that at least partially overlap in time with the first set of resources, the second set of resources being within a same BWP as the first set of resources but covering a different frequency range than the first set of resources. The communications manager 1020 may be configured as or otherwise support a means for modifying at least a portion of the sidelink communications over the second set of resources based on receipt of the cancellation indicator pertaining to the first set of resources.

By including or configuring the communications manager 1020 in accordance with examples as described herein, the device 1005 may support techniques for reduced latency and improved communications over sidelink resources. By avoiding AGC issues or recalibrating AGC to account for power variation within a communication slot, a sidelink UE may support timely transmissions of high priority transmissions while negating possible power overload or noisy reception of sidelink transmissions. Avoiding power overload or noisy reception may reduce the number of retransmissions within sidelink resources, while also reducing latency for both sidelink and high priority transmissions. Additionally, the detection of non-overlapping resources improves device to device coordination while maintaining previous signaling overhead.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of mitigating the impact of uplink or sidelink cancellation as described herein, or the processor 1040 and the memory 1030 may be otherwise configured to perform or support such operations.

Figure 11:
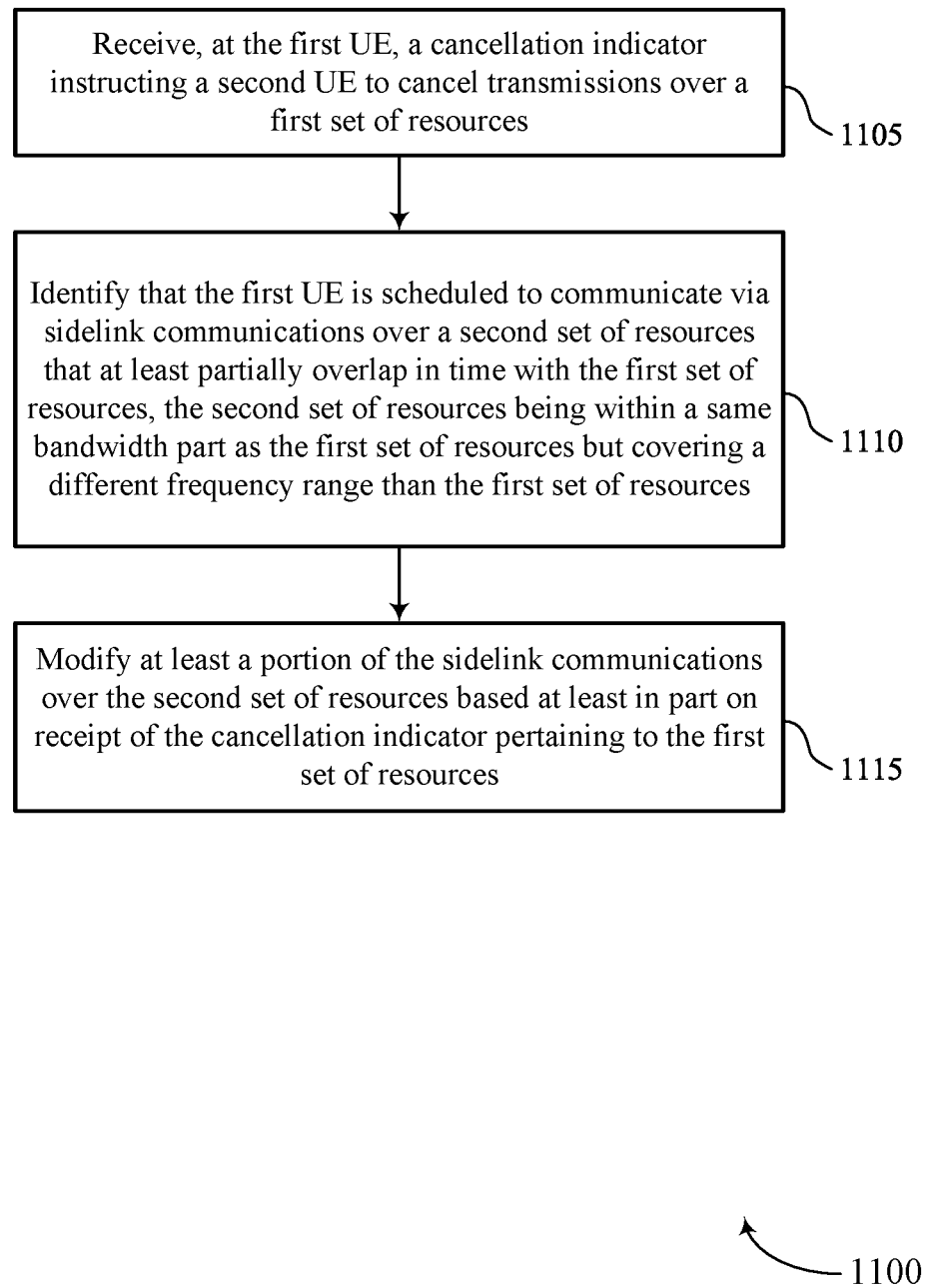
FIGS. 11 through 13 show flowcharts illustrating methods that support mitigating the impact of uplink or sidelink cancellation in accordance with aspects of the present disclosure.

FIG. 11 shows a flowchart illustrating a method 1100 that supports mitigating the impact of uplink or sidelink cancellation in accordance with aspects of the present disclosure. The operations of the method 1100 may be implemented by a UE or its components as described herein. For example, the operations of the method 1100 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1105, the method may include receiving, at the first UE, a cancellation indicator instructing a second UE to cancel transmissions over a first set of resources. The operations of 1105 may be performed in accordance with examples as disclosed herein. In some examples, aspects of the operations of 1105 may be performed by a cancellation indicator receiver component 925 as described with reference to FIG. 9.

At 1110, the method may include identifying that the first UE is scheduled to communicate via sidelink communications over a second set of resources that at least partially overlap in time with the first set of resources, the second set of resources being within a same BWP as the first set of resources but covering a different frequency range than the first set of resources. The operations of 1110 may be performed in accordance with examples as disclosed herein. In some examples, aspects of the operations of 1110 may be performed by a partial overlap identification component 930 as described with reference to FIG. 9.

At 1115, the method may include modifying at least a portion of the sidelink communications over the second set of resources based on receipt of the cancellation indicator pertaining to the first set of resources. The operations of 1115 may be performed in accordance with examples as disclosed herein. In some examples, aspects of the operations of 1115 may be performed by a sidelink communication modification component 935 as described with reference to FIG. 9.

Figure 12:
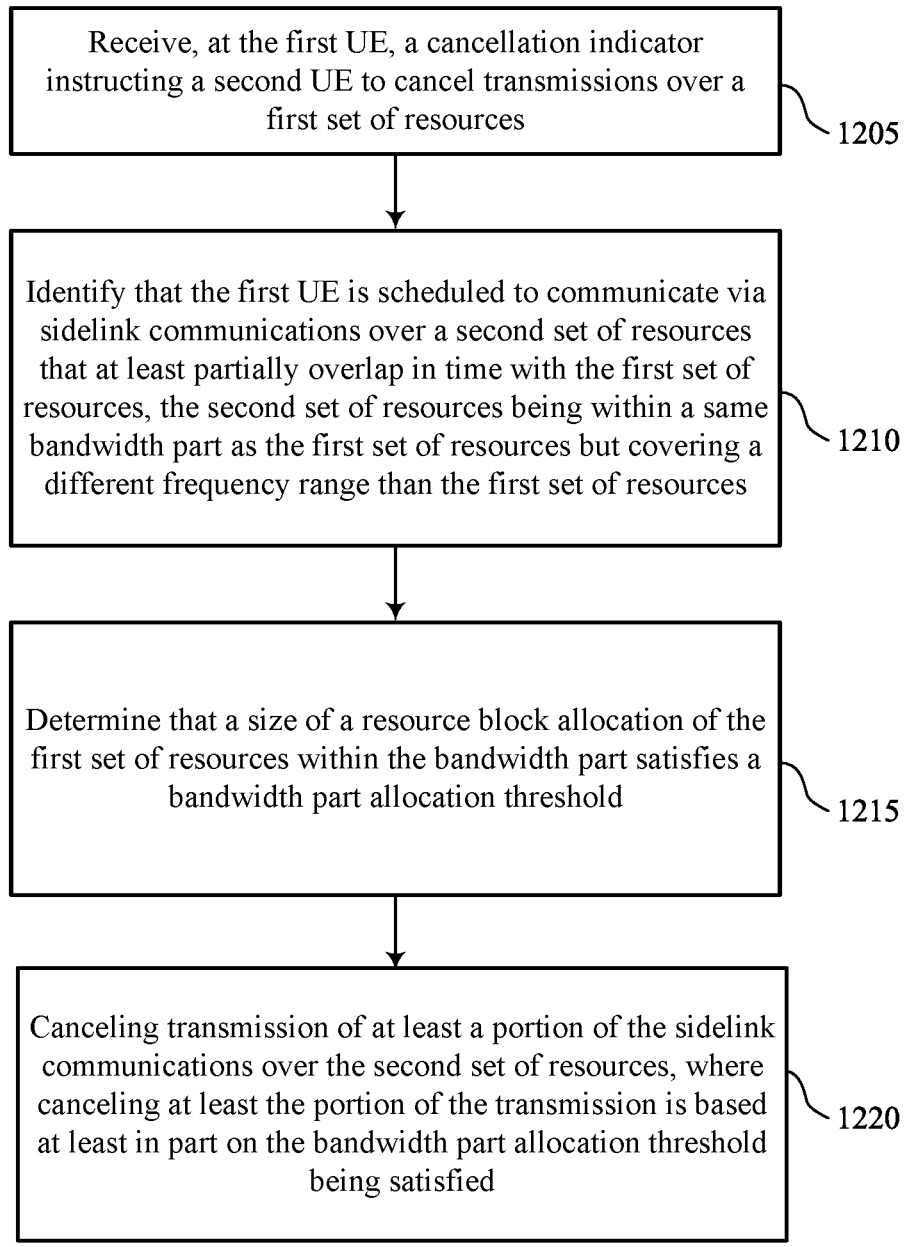

FIG. 12 shows a flowchart illustrating a method 1200 that supports mitigating the impact of uplink or sidelink cancellation in accordance with aspects of the present disclosure. The operations of the method 1200 may be implemented by a UE or its components as described herein. For example, the operations of the method 1200 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1205, the method may include receiving, at the first UE, a cancellation indicator instructing a second UE to cancel transmissions over a first set of resources. The operations of 1205 may be performed in accordance with examples as disclosed herein. In some examples, aspects of the operations of 1205 may be performed by a cancellation indicator receiver component 925 as described with reference to FIG. 9.

At 1210, the method may include identifying that the first UE is scheduled to communicate via sidelink communications over a second set of resources that at least partially overlap in time with the first set of resources, the second set of resources being within a same BWP as the first set of resources but covering a different frequency range than the first set of resources. The operations of 1210 may be performed in accordance with examples as disclosed herein. In some examples, aspects of the operations of 1210 may be performed by a partial overlap identification component 930 as described with reference to FIG. 9.

At 1215, the method may include determining that a size of a resource block allocation of the first set of resources within the BWP satisfies a BWP allocation threshold. The operations of 1215 may be performed in accordance with examples as disclosed herein. In some examples, aspects of the operations of 1215 may be performed by a BWP allocation threshold component 980 as described with reference to FIG. 9.

At 1220, the method may include canceling transmission of at least a portion of the sidelink communications over the second set of resources, where canceling at least the portion of the transmission is based at least in part on the BWP allocation threshold being satisfied. The operations of 1220 may be performed in accordance with examples as disclosed herein. In some examples, aspects of the operations of 1220 may be performed by a sidelink communication modification component 935 as described with reference to FIG. 9.

Figure 13:
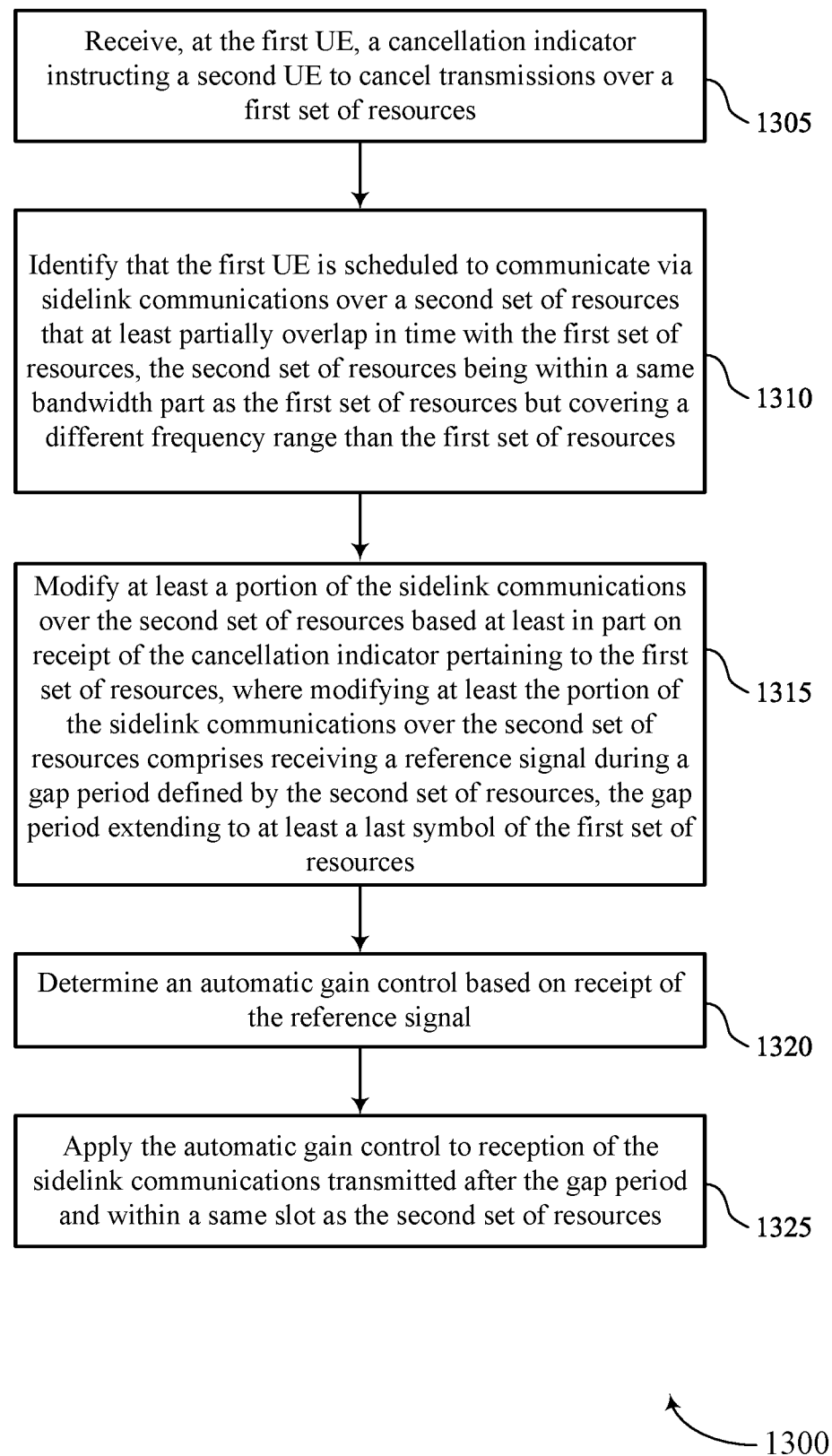

FIG. 13 shows a flowchart illustrating a method 1300 that supports mitigating the impact of uplink or sidelink cancellation in accordance with aspects of the present disclosure. The operations of the method 1300 may be implemented by a UE or its components as described herein. For example, the operations of the method 1300 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1305, the method may include receiving, at the first UE, a cancellation indicator instructing a second UE to cancel transmissions over a first set of resources. The operations of 1305 may be performed in accordance with examples as disclosed herein. In some examples, aspects of the operations of 1305 may be performed by a cancellation indicator receiver component 925 as described with reference to FIG. 9.

At 1310, the method may include identifying that the first UE is scheduled to communicate via sidelink communications over a second set of resources that at least partially overlap in time with the first set of resources, the second set of resources being within a same BWP as the first set of resources but covering a different frequency range than the first set of resources. The operations of 1310 may be performed in accordance with examples as disclosed herein. In some examples, aspects of the operations of 1310 may be performed by a partial overlap identification component 930 as described with reference to FIG. 9.

At 1315, the method may include modifying at least a portion of the sidelink communications over the second set of resources based on receipt of the cancellation indicator pertaining to the first set of resources, where modifying at least the portion of the sidelink communications over the second set of resources includes receiving a reference signal during a gap period defined by the second set of resources, the gap period extending to at least a last symbol of the first set of resources. The operations of 1315 may be performed in accordance with examples as disclosed herein. In some examples, aspects of the operations of 1315 may be performed by a reference signal receiver component 955 or a sidelink communication modification component 935 as described with reference to FIG. 9.

At 1320, the method may include determining an automatic gain control based on receipt of the reference signal. The operations of 1320 may be performed in accordance with examples as disclosed herein. In some examples, aspects of the operations of 1320 may be performed by an automatic gain control component 960 as described with reference to FIG. 9.

At 1325, the method may include applying the automatic gain control to reception of the sidelink communications transmitted after the gap period and within a same slot as the second set of resources. The operations of 1325 may be performed in accordance with examples as disclosed herein. In some examples, aspects of the operations of 1325 may be performed by an automatic gain control component 960 as described with reference to FIG. 9.

The following provides an overview of aspects of the present disclosure:

Aspect 1: A method for wireless communications at a first UE, comprising: receiving, at the first UE, a cancellation indicator instructing a second UE to cancel transmissions over a first set of resources; identifying that the first UE is scheduled to communicate via sidelink communications over a second set of resources that at least partially overlap in time with the first set of resources, the second set of resources being within a same BWP as the first set of resources but covering a different frequency range than the first set of resources; and modifying at least a portion of the sidelink communications over the second set of resources based at least in part on receipt of the cancellation indicator pertaining to the first set of resources.

Aspect 2: The method of aspect 1, wherein modifying at least the portion of the sidelink communications over the second set of resources further comprises: canceling transmission of at least a portion of the sidelink communications over the second set of resources.

Aspect 3: The method of aspect 2, further comprising: determining that a size of a resource block allocation of the first set of resources within the BWP satisfies a BWP allocation threshold, wherein canceling at least the portion of the transmission is based at least in part on the BWP allocation threshold being satisfied.

Aspect 4: The method of any of aspects 1 through 3, wherein modifying at least the portion of the sidelink communications over the second set of resources further comprises: canceling transmission of at least a portion of the sidelink communications over the second set of resources, wherein the second set of resources are within a threshold frequency range of the first set of resources and a threshold number of symbols of the first set of resources.

Aspect 5: The method of any of aspects 1 through 4, wherein modifying at least the portion of the sidelink communications over the second set of resources further comprises: identifying a first symbol of the second set of resources that overlaps in time with a first symbol of the first set of resources; and canceling transmission of at least a portion of the sidelink communications over the second set of resources, wherein the second set of resources extends from an initial symbol of the first set of resources to a last symbol in a slot that includes the second set of resources.

Aspect 6: The method of any of aspects 1 through 5, wherein modifying at least the portion of the sidelink communications over the second set of resources further comprises: canceling transmission of at least a first portion of the sidelink communications over the second set of resources; and transmitting a second portion of the sidelink communications over a third set of resources that is subsequent to the second set of resources in time and within a same slot as the second set of resources.

Aspect 7: The method of aspect 6, further comprising: transmitting, over one or more initial symbols of the third set of resources, a reference signal for AGC determination.

Aspect 8: The method of aspect 7, wherein the reference signal is a DMRS or a dedicated AGC reference signal.

Aspect 9: The method of any of aspects 6 through 8, further comprising: transmitting, over an initial symbol of the third set of resources, a communication that is a duplicate of either a previous symbol communication or a subsequent symbol communication.

Aspect 10: The method of any of aspects 6 through 9, further comprising: transmitting SCI that includes an indication that the sidelink communications are resumed or to be resumed via transmission of the second portion of the sidelink communications over the third set of resources.

Aspect 11: The method of any of aspects 6 through 10, further comprising: transmitting SCI that includes an indication that triggers AGC refinement during the second set of resources.

Aspect 12: The method of any of aspects 1 through 11, wherein modifying at least the portion of the sidelink communications over the second set of resources further comprises: receiving a reference signal during a gap period defined by the second set of resources, the gap period extending to at least a last symbol of the first set of resources; determining an AGC based on receipt of the reference signal; and applying the AGC to reception of the sidelink communications transmitted after the gap period and within a same slot as the second set of resources.

Aspect 13: The method of any of aspects 1 through 12, wherein modifying at least the portion of the sidelink communications over the second set of resources further comprises: performing a power measurement of communications transmitted over the first set of resources during a gap period defined by the second set of resources; refining AGC during the gap period; and applying a refined AGC to reception of the sidelink communications transmitted after the gap period and within a same slot as the second set of resources, the reception of the sidelink communications overlapping in time, at least partially, with the first set of resources.

Aspect 14: The method of aspect 13, further comprising: receiving SCI that includes an indication that the sidelink communications are resumed or to be resumed via transmission of the second portion of the sidelink communications after the gap period.

Aspect 15: The method of aspect 14, wherein the indication triggers the power measurement and AGC refinement during the gap period.

Aspect 16: The method of any of aspects 1 through 15, wherein modifying at least the portion of the sidelink communications over the second set of resources further comprises: identifying a first symbol of the second set of resources that overlaps in time with an initial symbol of the first set of resources; transmitting, over the first symbol of the second set of resources, a communication for AGC determination; and transmitting the sidelink communications after the first symbol and during a remaining portion of the second set of resources.

Aspect 17: The method of aspect 16, wherein the communication for AGC determination is a duplicate of either a previous symbol communication or a subsequent symbol communication.

Aspect 18: The method of any of aspects 16 through 17, wherein the communication for AGC determination is a reference signal.

Aspect 19: The method of any of aspects 16 through 18, further comprising: identifying that a DMRS is scheduled to be transmitted during a symbol other than the first symbol; identifying that the DMRS is the communication for AGC determination; swapping a data signal scheduled to be transmitted on the first symbol with the DMRS such that the DMRS is transmitted on the first symbol; and transmitting SCI indicating a symbol index associated with the DMRS, wherein the symbol index is based at least in part on a generated DMRS sequence.

Aspect 20: The method of any of aspects 16 through 19, wherein the communication for AGC determination is a duplicate of either a previous symbol communication or a subsequent symbol communication.

Aspect 21: The method of any of aspects 16 through 20, wherein the communication for AGC determination is a reference signal.

Aspect 22: The method of any of aspects 16 through 21, further comprising: receiving, via either SCI or the cancellation indication, an indication that a symbol index associated with a DMRS, wherein the DMRS is the communication for AGC determination and wherein the symbol index is based at least in part on a generated DMRS sequence.

Aspect 23: The method of any of aspects 1 through 22, wherein modifying at least the portion of the sidelink communications over the second set of resources further comprises: identifying a first symbol of the second set of resources that overlaps in time with an initial symbol of the first set of resources; receiving, over the first symbol of the second set of resources, a communication for AGC determination; and receiving the sidelink communications after the first symbol and during a remaining portion of the second set of resources.

Aspect 24: An apparatus for wireless communications at a first UE, comprising a processor; memory coupled with the processor; and instructions stored in the memory and executable by the processor to cause the apparatus to perform a method of any of aspects 1 through 23.

Aspect 25: An apparatus for wireless communications at a first UE, comprising at least one means for performing a method of any of aspects 1 through 23.

Aspect 26: A non-transitory computer-readable medium storing code for wireless communications at a first UE, the code comprising instructions executable by a processor to perform a method of any of aspects 1 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first user equipment (UE), comprising:
    receiving, at the first UE, a cancellation indicator instructing a second UE to cancel transmissions over a first set of resources;
    identifying that the first UE is scheduled to communicate via sidelink communications over a second set of resources that at least partially overlap in time with the first set of resources, the second set of resources being within a same bandwidth part as the first set of resources but covering a different frequency range than the first set of resources; and
    modifying at least a portion of the sidelink communications over the second set of resources based at least in part on receipt of the cancellation indicator pertaining to the first set of resources.

2. The method of claim 1, wherein modifying at least the portion of the sidelink communications over the second set of resources further comprises:
    canceling transmission of at least a portion of the sidelink communications over the second set of resources.

3. The method of claim 2, further comprising:
    determining that a size of a resource block allocation of the first set of resources within the bandwidth part satisfies a bandwidth part allocation threshold, wherein canceling at least the portion of the transmission is based at least in part on the bandwidth part allocation threshold being satisfied.

4. The method of claim 1, wherein modifying at least the portion of the sidelink communications over the second set of resources further comprises:
   canceling transmission of at least a portion of the sidelink communications over the second set of resources, wherein the second set of resources are within a threshold frequency range of the first set of resources and a threshold number of symbols of the first set of resources.

5. The method of claim 1, wherein modifying at least the portion of the sidelink communications over the second set of resources further comprises:
   identifying a first symbol of the second set of resources that overlaps in time with a first symbol of the first set of resources; and
   canceling transmission of at least a portion of the sidelink communications over the second set of resources, wherein the second set of resources extends from an initial symbol of the first set of resources to a last symbol in a slot that includes the second set of resources.

6. The method of claim 1, wherein modifying at least the portion of the sidelink communications over the second set of resources further comprises:
   canceling transmission of at least a first portion of the sidelink communications over the second set of resources; and
   transmitting a second portion of the sidelink communications over a third set of resources that is subsequent to the second set of resources in time and within a same slot as the second set of resources.

7. The method of claim 6, further comprising:
   transmitting, over one or more initial symbols of the third set of resources, a reference signal for automatic gain control determination.

8. The method of claim 7, wherein the reference signal is a demodulation reference signal or a dedicated automatic gain control reference signal.

9. The method of claim 6, further comprising:
   transmitting, over an initial symbol of the third set of resources, a communication that is a duplicate of either a previous symbol communication or a subsequent symbol communication.

10. The method of claim 6, further comprising:
    transmitting sidelink control information that includes an indication that the sidelink communications are resumed or to be resumed via transmission of the second portion of the sidelink communications over the third set of resources.

11. The method of claim 6, further comprising:
    transmitting sidelink control information that includes an indication that triggers automatic gain control refinement during the second set of resources.

12. The method of claim 1, wherein modifying at least the portion of the sidelink communications over the second set of resources further comprises:
    receiving a reference signal during a gap period defined by the second set of resources, the gap period extending to at least a last symbol of the first set of resources;
    determining an automatic gain control based on receipt of the reference signal; and
    applying the automatic gain control to reception of the sidelink communications transmitted after the gap period and within a same slot as the second set of resources.

13. The method of claim 1, wherein modifying at least the portion of the sidelink communications over the second set of resources further comprises:
    performing a power measurement of communications transmitted over the first set of resources during a gap period defined by the second set of resources;
    refining automatic gain control during the gap period; and
    applying a refined automatic gain control to reception of the sidelink communications transmitted after the gap period and within a same slot as the second set of resources, the reception of the sidelink communications overlapping in time, at least partially, with the first set of resources.

14. The method of claim 13, further comprising:
    receiving sidelink control information that includes an indication that the sidelink communications are resumed or to be resumed via transmission of the second portion of the sidelink communications after the gap period.

15. The method of claim 14, wherein the indication triggers the power measurement and automatic gain control refinement during the gap period.

16. The method of claim 1, wherein modifying at least the portion of the sidelink communications over the second set of resources further comprises:
    identifying a first symbol of the second set of resources that overlaps in time with an initial symbol of the first set of resources;
    transmitting, over the first symbol of the second set of resources, a communication for automatic gain control determination; and
    transmitting the sidelink communications after the first symbol and during a remaining portion of the second set of resources.

17. The method of claim 16, wherein the communication for automatic gain control determination is a duplicate of either a previous symbol communication or a subsequent symbol communication.

18. The method of claim 16, wherein the communication for automatic gain control determination is a reference signal.

19. The method of claim 16, further comprising:
    identifying that a demodulation reference signal is scheduled to be transmitted during a symbol other than the first symbol;
    identifying that the demodulation reference signal is the communication for automatic gain control determination;
    swapping a data signal scheduled to be transmitted on the first symbol with the demodulation reference signal such that the demodulation reference signal is transmitted on the first symbol; and
    transmitting sidelink control information indicating a symbol index associated with the demodulation reference signal, wherein the symbol index is based at least in part on a generated demodulation reference signal sequence.

20. The method of claim 16, wherein the communication for automatic gain control determination is a duplicate of either a previous symbol communication or a subsequent symbol communication.

21. The method of claim 16, wherein the communication for automatic gain control determination is a reference signal.

22. The method of claim 16, further comprising:
receiving, via either sidelink control information or the cancellation indication, an indication that a symbol index associated with a demodulation reference signal, wherein the demodulation reference signal is the communication for automatic gain control determination and wherein the symbol index is based at least in part on a generated demodulation reference signal sequence.

23. The method of claim 1, wherein modifying at least the portion of the sidelink communications over the second set of resources further comprises:
identifying a first symbol of the second set of resources that overlaps in time with an initial symbol of the first set of resources;
receiving, over the first symbol of the second set of resources, a communication for automatic gain control determination; and
receiving the sidelink communications after the first symbol and during a remaining portion of the second set of resources.

24. An apparatus for wireless communications at a first user equipment (UE), comprising:
a processor;
memory coupled with the processor; and
instructions stored in the memory and executable by the processor to cause the apparatus to:
receive, at the first UE, a cancellation indicator instructing a second UE to cancel transmissions over a first set of resources;
identify that the first UE is scheduled to communicate via sidelink communications over a second set of resources that at least partially overlap in time with the first set of resources, the second set of resources being within a same bandwidth part as the first set of resources but covering a different frequency range than the first set of resources; and
modify at least a portion of the sidelink communications over the second set of resources based at least in part on receipt of the cancellation indicator pertaining to the first set of resources.

25. The apparatus of claim 24, wherein the instructions to modify at least the portion of the sidelink communications over the second set of resources are further executable by the processor to cause the apparatus to:
cancel transmission of at least a portion of the sidelink communications over the second set of resources.

26. The apparatus of claim 25, wherein the instructions are further executable by the processor to cause the apparatus to:
determine that a size of a resource block allocation of the first set of resources within the bandwidth part satisfies a bandwidth part allocation threshold, wherein canceling at least the portion of the transmission is based at least in part on the bandwidth part allocation threshold being satisfied.

27. The apparatus of claim 24, wherein the instructions to modify at least the portion of the sidelink communications over the second set of resources are further executable by the processor to cause the apparatus to:
cancel transmission of at least a portion of the sidelink communications over the second set of resources, wherein the second set of resources are within a threshold frequency range of the first set of resources and a threshold number of symbols of the first set of resources.

28. The apparatus of claim 24, wherein the instructions to modify at least the portion of the sidelink communications over the second set of resources are further executable by the processor to cause the apparatus to:
identify a first symbol of the second set of resources that overlaps in time with a first symbol of the first set of resources; and
cancel transmission of at least a portion of the sidelink communications over the second set of resources, wherein the second set of resources extends from an initial symbol of the first set of resources to a last symbol in a slot that includes the second set of resources.

29. An apparatus for wireless communications at a first user equipment (UE), comprising:
means for receiving, at the first UE, a cancellation indicator instructing a second UE to cancel transmissions over a first set of resources;
means for identifying that the first UE is scheduled to communicate via sidelink communications over a second set of resources that at least partially overlap in time with the first set of resources, the second set of resources being within a same bandwidth part as the first set of resources but covering a different frequency range than the first set of resources; and
means for modifying at least a portion of the sidelink communications over the second set of resources based at least in part on receipt of the cancellation indicator pertaining to the first set of resources.

30. A non-transitory computer-readable medium storing code for wireless communications at a first user equipment (UE), the code comprising instructions executable by a processor to:
receive, at the first UE, a cancellation indicator instructing a second UE to cancel transmissions over a first set of resources;
identify that the first UE is scheduled to communicate via sidelink communications over a second set of resources that at least partially overlap in time with the first set of resources, the second set of resources being within a same bandwidth part as the first set of resources but covering a different frequency range than the first set of resources; and
modify at least a portion of the sidelink communications over the second set of resources based at least in part on receipt of the cancellation indicator pertaining to the first set of resources.

* * * * *